(12) United States Patent
    Pan

(10) Patent No.: US 9,118,906 B2
(45) Date of Patent: Aug. 25, 2015

(54) THREE-DIMENSIONAL IMAGING DEVICE AND AUTOFOCUS ADJUSTMENT METHOD FOR THREE-DIMENSIONAL IMAGING DEVICE

(71) Applicant: FUJIFILM Corporation, Tokyo (JP)

(72) Inventor: Yi Pan, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 165 days.

(21) Appl. No.: 13/675,553

(22) Filed: Nov. 13, 2012

(65) Prior Publication Data
    US 2013/0070061 A1    Mar. 21, 2013

Related U.S. Application Data

(63) Continuation of application No. PCT/JP2011/060946, filed on May 12, 2011.

(30) Foreign Application Priority Data

May 14, 2010    (JP) ................................ 2010-112092

(51) Int. Cl.
    *H04N 13/02*    (2006.01)
    *G03B 13/36*    (2006.01)
    *G03B 19/07*    (2006.01)
    *G03B 35/08*    (2006.01)
    *G02B 7/36*    (2006.01)

(52) U.S. Cl.
    CPC ............ *H04N 13/0282* (2013.01); *G02B 7/365* (2013.01); *G03B 13/36* (2013.01); *G03B 19/07* (2013.01); *G03B 35/08* (2013.01)

(58) Field of Classification Search
    USPC ....................................................... 348/47–50
    See application file for complete search history.

(56) References Cited

U.S. PATENT DOCUMENTS

| 2004/0052514 | A1  | 3/2004 | Hirai |
| 2007/0024738 | A1* | 2/2007 | Kanai et al. .................... 348/335 |
| 2007/0064142 | A1* | 3/2007 | Misawa et al. ............ 348/333.01 |

FOREIGN PATENT DOCUMENTS

| JP | 2004-102135 A | 4/2004 |
| JP | 2005-45511 A  | 2/2005 |
| JP | 2006-162990 A | 6/2006 |

* cited by examiner

*Primary Examiner* — Chikaodili E Anyikire
(74) *Attorney, Agent, or Firm* — Birch, Stewart, Kolasch & Birch, LLP

(57) ABSTRACT

An autofocus adjustment method for a three-dimensional imaging device, includes: a step of, when a first lens position is not found during search operation of a first focus lens of a first imaging optical system within a first search range, allowing a second focus lens of a second imaging optical system to perform search operation within the first search range, and during the search operation, searching for a second lens position at which the second focus lens focuses on the subject based on a second viewpoint image from the second imaging unit; a step of allowing the second focus lens to move to the second lens position; a step of calculating the first lens position based on the second lens position and a focus position displacement amount preliminarily stored in a storage; and a step of allowing the first focus lens to move to the first lens position thus calculated.

14 Claims, 15 Drawing Sheets

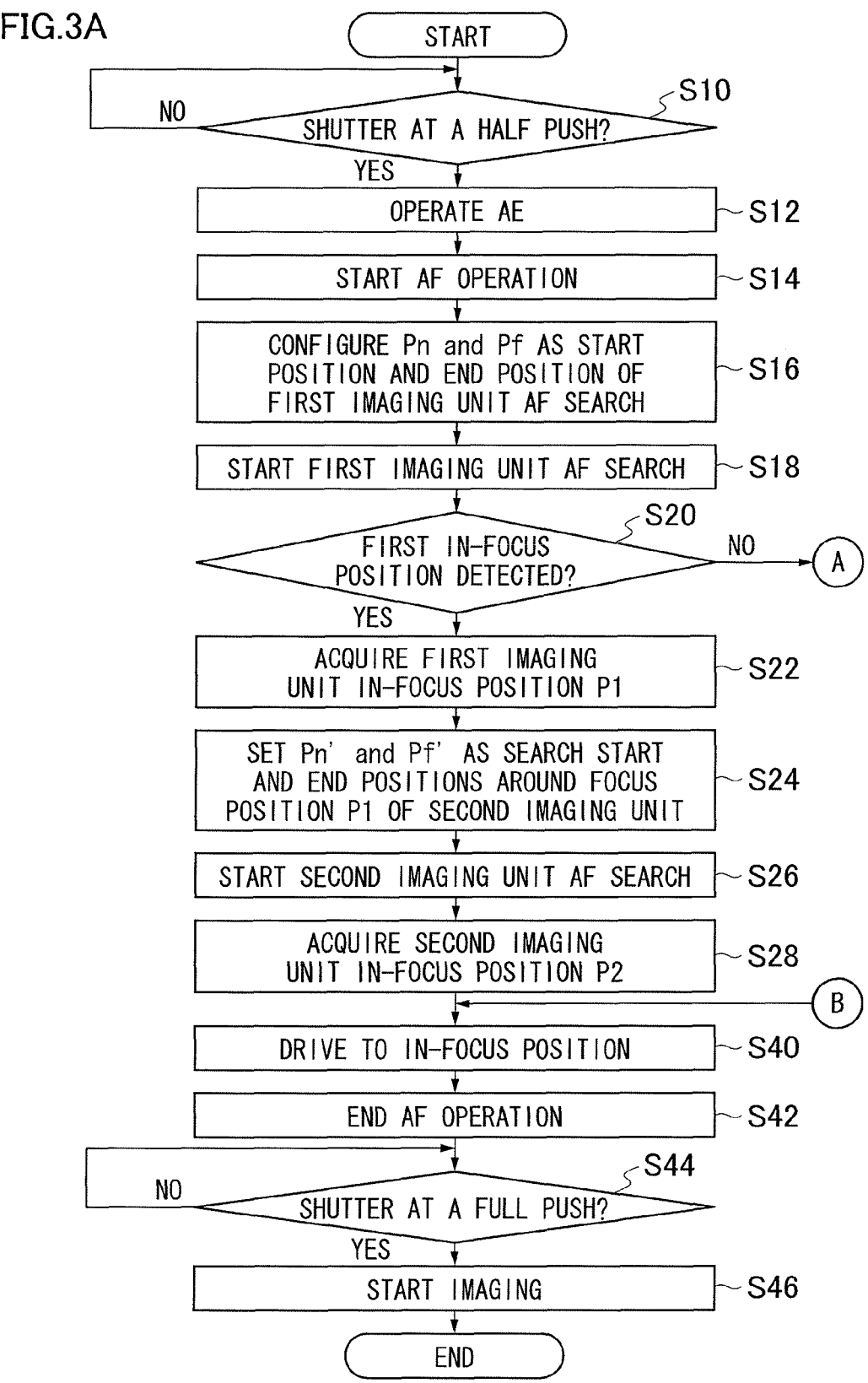

FIRST IMAGING UNIT AF OPERATION

SECOND IMAGING UNIT AF OPERATION
(IN CASE THAT IN-FOCUS POSITION CAN BE DETECTED)

\* Pn' = P1+N
Pf' = P1−F

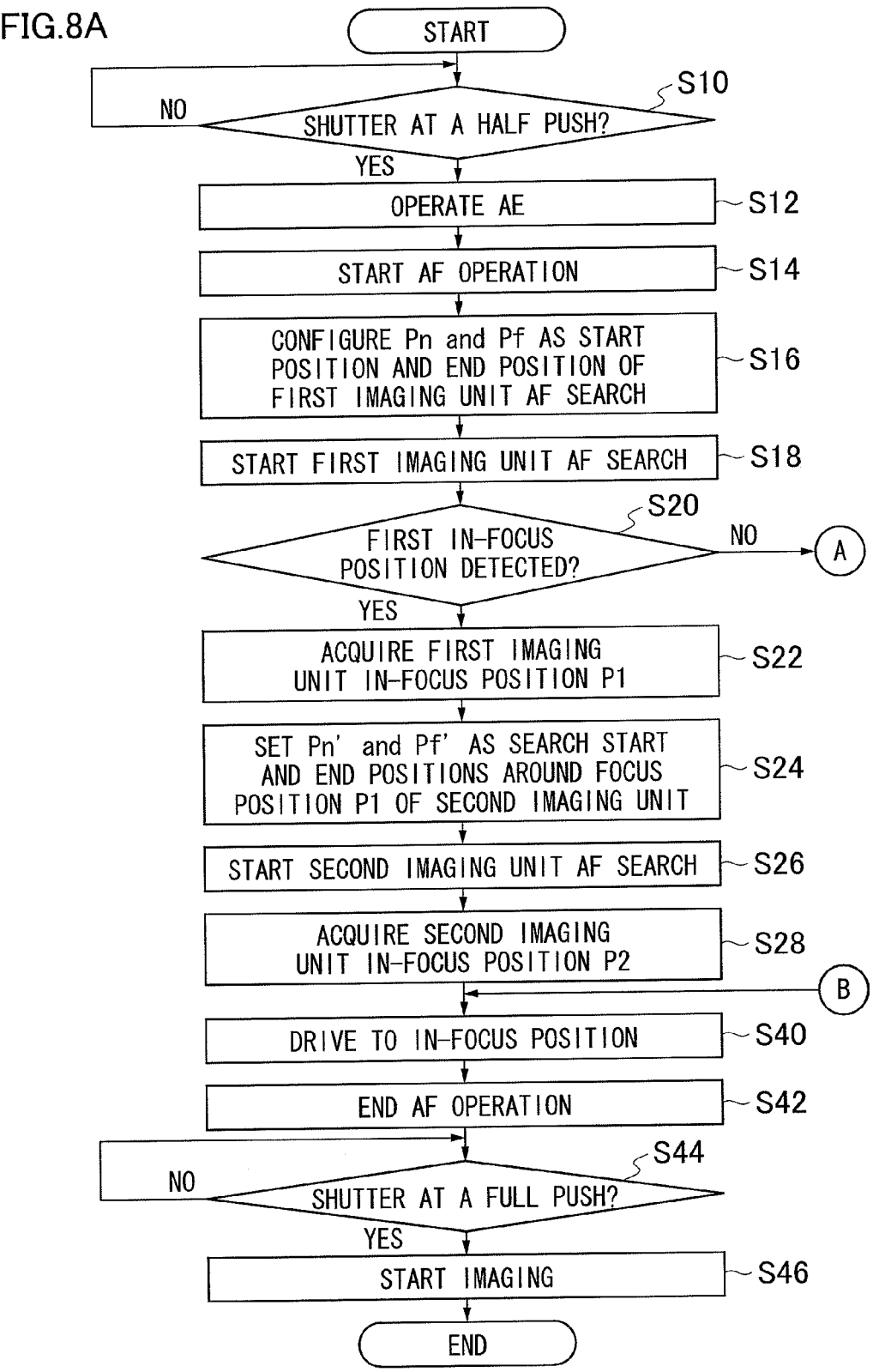

THREE-DIMENSIONAL IMAGING DEVICE AND AUTOFOCUS ADJUSTMENT METHOD FOR THREE-DIMENSIONAL IMAGING DEVICE

CROSS-REFERENCE TO RELATED APPLICATIONS

This application is a PCT Bypass continuation application and claims the priority benefit under 35 U.S.C. §120 of PCT Application No. PCT/JP2011/060946 filed on May 12, 2011 which application designates the U.S., and also claims the priority benefit under 35 U.S.C. §119 of Japanese Patent Application No. 2010-112092 filed on May 14, 2010, which applications are all hereby incorporated in their entireties by reference.

BACKGROUND OF THE INVENTION

1. Field of the Invention

The presently disclosed subject matter relates to a three-dimensional imaging device and an autofocus adjustment method for the three-dimensional imaging device, and specifically relates to a technology for efficiently searching for in-focus positions of two imaging units and enhancing focusing accuracy as well.

2. Description of the Related Art

Conventionally, a number of three-dimensional imaging devices including two imaging units have been proposed (see, Japanese Patent Application Laid-Open No. 2005-045511 and Japanese Patent Application Laid-Open No. 2006-162990). While the three-dimensional imaging device can perform three-dimensional imaging which images the same subject from different viewpoints using the two imaging units, it can perform super-wide-angle panoramic imaging, imaging in different sensitivities for the respective two imaging units, and the like.

According to the one performing the above-mentioned three-dimensional imaging using the two imaging units, the two imaging units are arranged at the positions corresponding to a right eye and a left eye, being given parallax, and based on image signals outputted from the both imaging units, an image signal for the right eye and an image signal for the left eye are generated by signal processing units at their downstream, respectively. Inputting the image signal for the right eye and the image signal for the left eye thus generated by the signal processing units of the three-dimensional imaging device into a display device having a display screen capable of three-dimensional display gives a three-dimensional image on the display screen.

Incidentally, a number of digital cameras perform so-called contrast AF (Auto Focus) as focus adjustment, which is adjustment of an in-focus position, where autofocus adjustment means which is built inside allows a focus lens in an imaging optical system to move within a predetermined search range, detects contrast of an image, which is being imaged, during the period of moving the focus lens, and allows the focus lens to move to the in-focus position (lens position) at which the contrast is at its maximum.

As to the three-dimensional imaging device in the above-mentioned Japanese Patent Application Laid-Open No. 2005-045511, for the reason that the two imaging units take the same subject, the contrast AF is performed only in one imaging unit, and the result of the contrast AF is reflected to the other imaging unit. Thereby, time required for the contrast AF of the imaging device having two imaging units is reduced. Moreover, Japanese Patent Application Laid-Open No. 2006-162990 proposes a technology for three-dimensional imaging devices that AF search is performed by moving focus lenses included in the both imaging units in directions reverse to each other and that the in-focus positions of the both imaging units are determined using the AF search result of the imaging unit that has detected the in-focus position earlier out of the both imaging units.

SUMMARY OF THE INVENTION

However, for the two imaging units, there are variations in lens diameters of focus lenses, diameters of lens cylinders, light sensitivities of imaging sensors, and the like unavoidably (hereinafter in the description, they are referred to as individual differences collectively). For this reason, the configuration in which the in-focus position of one imaging unit is reflected to that of the other imaging unit as mentioned for Japanese Patent Application Laid-Open No. 2005-045511 and Japanese Patent Application Laid-Open No. 2006-162990 causes the problem that such individual differences give some displacement on the in-focus position of the other imaging unit.

On the other hand, individually performing AF operation in the respective imaging units can solve the problem of the individual differences of the two imaging units but causes less efficiency.

The presently disclosed subject matter is devised in view of the aforementioned circumstances, and the object is to provide a three-dimensional imaging device and an autofocus adjustment method thereof capable of efficiently performing AF operation in two imaging units and performing focus adjustment high in focusing accuracy even in case of individual differences of the two imaging units.

In order to achieve the object, a three-dimensional imaging device according to a first aspect of the presently disclosed subject matter includes: a first imaging unit including a first imaging optical system including a first focus lens, the first imaging unit including a first imaging sensor which performs photoelectric conversion on subject light imaged thereon through the first imaging optical system to output a first viewpoint image; a second imaging unit including a second imaging optical system including a second focus lens, the second imaging unit including a second imaging sensor which performs photoelectric conversion on subject light imaged thereon through the second imaging optical system to output a second viewpoint image; a storage which preliminarily stores a focus position displacement amount between a first lens position of the first focus lens and a second lens position of the second focus lens in focusing on a subject at the same distance; and a focus adjustment unit which allows the first focus lens to perform search operation within a predetermined first search range, searches for a first lens position at which the subject is focused on based on the first viewpoint image acquired from the first imaging unit, moves the first focus lens to the first lens position, allows, as to the second imaging optical system, the second focus lens to perform search operation within a second search range which is narrower than the first search range and is in the vicinity of a lens position of the second focus lens corresponding to the searched first lens position, searches for a second lens position at which the subject is focused on based on the second viewpoint image acquired from the second imaging unit, and moves the second focus lens to the second lens position, wherein when an in-focus position of the first lens position is not found within the first search range, the focus adjustment unit allows the second focus lens to perform search operation within the first search range, searches for the second lens position at which the subject is focused on based on the second viewpoint image acquired from the second imaging unit, moves the second focus lens to the second lens position, calculates the first lens position based on the searched second lens position and the focus position displacement amount stored in the storage, and moves the first focus lens to the first lens position.

According to the above-mentioned first aspect, as to the first imaging optical system, the first focus lens is allowed to perform search operation within the predetermined first search range, the first lens position at which the subject is focused on is searched for, the first focus lens is allowed to move to the first lens position, on the other hand, as to the second imaging optical system, the second focus lens is allowed to perform search operation within the second search range which is narrower than the first search range and is in the vicinity of the lens position of the second focus lens corresponding to the first lens position thus searched for, the second lens position at which the subject is focused on is searched for, and the second focus lens is allowed to move to this second lens position. For this reason, focusing which is not affected by individual differences of the first and second imaging units can be performed. Furthermore, taking advantage of the first searched for in-focus position (first lens position), the second search range of the second focus lens is made narrower than the first search range, and thereby searching for the in-focus position (second lens position) of the second focus lens can be performed for short time.

Moreover, when the in-focus position of the first lens position is not found within the first search range, the second focus lens is allowed to perform search operation within the first search range, the second lens position at which the subject is focused on is searched for based on the second viewpoint image acquired from the second imaging unit, and the second focus lens is allowed to move to this second lens position thus searched for. For this reason, the second focus lens can be allowed to move to the in-focus position accurately. Furthermore, as to the first focus lens for which the in-focus position of the first lens position is not found, the first lens position is calculated based on the second lens position thus searched for and the focus position displacement amount stored in the storage, and the first focus lens is allowed to move to this first lens position thus calculated. For this reason, focus adjustment can be performed accurately even in case of individual differences of the first and second imaging units.

A three-dimensional imaging device according to a second aspect of the presently disclosed subject matter is set forth in the above-mentioned first aspect, wherein when the first lens position is not searched for and the second lens position is searched for within the first search range, the focus adjustment unit allows the first focus lens to perform search operation within the second search range which is narrower than the first search range and is in the vicinity of a lens position of the first focus lens corresponding to the searched second lens position, searches for the first lens position at which the subject is focused on based on the first viewpoint image acquired from the first imaging unit, moves the first focus lens to the first lens position, when an in-focus position of the first lens position is not found within the second search range, calculates the first lens position based on the searched second lens position and the focus position displacement amount stored in the storage, and moves the first focus lens to the first lens position.

According to the above-mentioned second aspect, the first focus lens is allowed to perform search operation (re-search) within the second search range based on the search result of the first search range of the second focus lens. Therefore, synthesis accuracy can be enhanced.

A three-dimensional imaging device according to a third aspect of the presently disclosed subject matter is set forth in the above-mentioned first or second aspect, wherein when an in-focus position of the second lens position is not found within the second search range, the focus adjustment unit calculates the second lens position based on the searched first lens position and the focus position displacement amount stored in the storage, and moves the second focus lens to the second lens position.

Thereby, even when the in-focus position of the second lens position of the second focus lens is not found within the second search range, the second lens position corresponding to the second focus lens can be obtained accurately even in case of individual differences of the first and second imaging units.

A three-dimensional imaging device according to a fourth aspect of the presently disclosed subject matter is set forth in any of the above-mentioned first to third aspects, wherein the focus adjustment unit includes a lens position storage which stores a focus lens position at which the subject is focused on, which subject is at a subject distance corresponding to a cross point at which a light axis of the first imaging optical system crosses a light axis of the second imaging optical system, and when both the first lens position and the second lens position is not searched for within the first search range, the focus adjustment unit moves the first focus lens and the second focus lens to the focus lens position stored in the lens position storage.

The subject image at the distance of the cross point hardly causes a parallax amount and, therefore, does not cause excess three-dimensional feeling. For this reason, the user rarely suffers from discomfort on the occasion of the three-dimensional view of the subject image at the distance of the cross point. Accordingly, it is desirable to allow the first focus lens and the second focus lens to move such that they focus at the distance of the cross point when the first and second lens positions cannot be searched for within the first search range.

A three-dimensional imaging device according to a fifth aspect of the presently disclosed subject matter is set forth in any of the above-mentioned first to third aspects, further including: a parallax adjustment unit which adjusts parallax by performing relative image shift on the first viewpoint image and the second viewpoint image acquired respectively from the first imaging unit and the second imaging unit; and a distance calculation unit which calculates a subject distance corresponding to a cross point, at which a light axis of the first imaging optical system crosses a light axis of the second imaging optical system after virtual change of the light axes, based on a shift amount of the image shift performed by the parallax adjustment unit, wherein the focus adjustment unit includes a lens position storage which stores a focus lens position at which the subject is focused on, which subject is at the subject distance, for each subject distance, when both the first lens position and the second lens position is not searched for within the first search range, the focus adjustment unit reads out a lens position corresponding to the calculated subject distance from the lens position storage, and moves the first focus lens and the second focus lens to the read lens position.

By performing relative image shift on the first viewpoint image and the second viewpoint image, the cross point of the optical axes of the first and second imaging optical systems can be moved virtually. Then, the distance calculation unit calculates the distance of the virtual cross point having undergone the change due to the image shift. The focus adjustment unit reads out the lens positions at which the subject at the distance thus calculated is focused on from the lens position storage, and allows the first and second focus lenses to move to the lens positions thus read out. In addition, the read out lens positions are read out as the individually different lens positions according to individual differences of the first and second imaging units, or the lens position for any one of the first and second focus lenses and the focus position displacement amount corresponding to the lens position are read out.

A three-dimensional imaging device according to a sixth aspect of the presently disclosed subject matter is set forth in the above-mentioned fifth aspect, further including a three-dimensional display unit which displays a three-dimensional image based on the first viewpoint image and the second viewpoint image acquired respectively from the first imaging unit and the second imaging unit, wherein the parallax adjustment unit includes: a manipulation member which performs manual adjustment of parallax; and a first image shift unit which performs relative image shift on the first viewpoint image and the second viewpoint image regarding display position in the three-dimensional display unit according to manipulation of the manipulation member.

A three-dimensional imaging device according to a seventh aspect of the presently disclosed subject matter is set forth in the above-mentioned fifth or sixth aspect, wherein the parallax adjustment unit includes: a detection unit which detects a position displacement of a subject within focus areas of the first viewpoint image and the second viewpoint image acquired respectively from the first imaging unit and the second imaging unit; and a second image shift unit which performs relative image shift on the first viewpoint image and the second viewpoint image such that the detected position displacement becomes zero.

A three-dimensional imaging device according to an eighth aspect of the presently disclosed subject matter is set forth in the above-mentioned first or second aspect, wherein the first imaging optical system and the second imaging optical system each includes a zoom lens, the storage preliminarily stores a focus position displacement amount between a first lens position of the first focus lens and a second lens position of the second focus lens in focusing on a subject at the same distance, for each zoom position of the zoom lens, and when calculating the first lens position, the focus adjustment unit reads out a focus position displacement amount corresponding to a zoom position of the zoom lens from the storage, and calculates the first lens position based on the focus position displacement amount and the searched second lens position.

The focus position displacement amount between the first and second focus lenses which is caused by individual differences of the first and second imaging units in the case that they focus on the same subject is different according to the zoom position. For this reason, in the above-mentioned eighth aspect, when the first lens position is calculated, the focus position displacement amount corresponding to the zoom position is read out from the storage, and based on this focus position displacement amount and the second lens position, the first lens position is calculated.

A three-dimensional imaging device according to a ninth aspect of the presently disclosed subject matter is set forth in the above-mentioned third aspect, wherein the first imaging optical system and the second imaging optical system each includes a zoom lens, the storage preliminarily stores a focus position displacement amount between a first lens position of the first focus lens and a second lens position of the second focus lens in focusing on a subject at the same distance, for each zoom position of the zoom lens, and when calculating the second lens position, the focus adjustment unit reads out a focus position displacement amount corresponding to a zoom position of the zoom lens from the storage, and calculates the second lens position based on the focus position displacement amount and the searched first lens position.

In the above-mentioned ninth aspect, similarly to the eighth aspect, when the second lens position is calculated, the focus position displacement amount corresponding to the zoom position is read out from the storage, and based on this focus position displacement amount and the first lens position, the second lens position is calculated.

A tenth aspect of the presently disclosed subject matter is an autofocus adjustment method for a three-dimensional imaging device including: a first imaging unit including a first imaging optical system including a first focus lens, the first imaging unit including a first imaging sensor which performs photoelectric conversion on subject light imaged thereon through the first imaging optical system to output a first viewpoint image; a second imaging unit including a second imaging optical system including a second focus lens, the second imaging unit including a second imaging sensor which performs photoelectric conversion on subject light imaged thereon through the second imaging optical system to output a second viewpoint image; and a storage which preliminarily stores a focus position displacement amount between a first lens position of the first focus lens and a second lens position of the second focus lens in focusing on a subject at the same distance, wherein the method including: a step of allowing the first focus lens to perform search operation within a predetermined first search range, and during the search operation, searching for a first lens position of the first focus lens at which position the subject is focused on based on the first viewpoint image acquired from the first imaging unit; a step of moving the first focus lens to the first lens position searched for within the first search range; a step of determining a second search range which is narrower than the first search range and is in the vicinity of a lens position of the second focus lens corresponding to the searched first lens position; a step of allowing the second focus lens to perform search operation within the determined second search range, and during the search operation, searching for a second lens position of the second focus lens at which position the subject is focused on based on the second viewpoint image acquired from the second imaging unit; a step of moving the second focus lens to the second lens position searched for within the second search range; a step of, when the first lens position is not found within the first search range, allowing the second focus lens to perform search operation within the first search range, and during the search operation, searching for a second lens position of the second focus lens at which position the subject is focused on based on the second viewpoint image acquired from the second imaging unit; a step of moving the second focus lens to the second lens position searched for within the first search range; a step of calculating the first lens position based on the second lens position searched for within the first search range and the focus position displacement amount stored in the storage; and a step of moving the first focus lens to the calculated first lens position.

An autofocus adjustment method for a three-dimensional imaging device according to a eleventh aspect of the presently disclosed subject matter is set forth in the above-mentioned tenth aspect, further including: a step of, when the first lens position is not searched for and the second lens position is searched for within the first search range, determining the second search range which is narrower than the first search range and is in the vicinity of a lens position of the first focus lens corresponding to the searched second lens position; a step of allowing the first focus lens to perform search operation within the determined second search range, and searching for the first lens position of the first focus lens at which the subject is focused on based on the first viewpoint image acquired from the first imaging unit during the search operation; and a step of moving the first focus lens to the first lens position searched for within the second search range.

An autofocus adjustment method for a three-dimensional imaging device according to a twelfth aspect of the presently disclosed subject matter is set forth in the above-mentioned tenth or eleventh aspect, further including: a step of, when an in-focus position of the second lens position is not found within the second search range, calculating the second lens position based on the searched first lens position and the focus position displacement amount stored in the storage; and a step of moving the second focus lens to the calculated second lens position.

An autofocus adjustment method for a three-dimensional imaging device according to a thirteenth aspect of the presently disclosed subject matter is set forth in any of the above-mentioned tenth to twelfth aspects, wherein the three-dimensional imaging device further includes a lens position storage which stores a focus lens position at which the subject is focused on, which subject is at a subject distance corresponding to a cross point at which a light axis of the first imaging optical system crosses a light axis of the second imaging optical system, and the method further includes a step of, when both the first lens position and the second lens position is not searched for within the first search range, moving the first focus lens and the second focus lens to the focus lens position stored in the lens position storage.

An autofocus adjustment method for a three-dimensional imaging device according to a fourteenth aspect of the presently disclosed subject matter is set forth in any of the above-mentioned tenth to twelfth aspects, wherein the three-dimensional imaging device further includes a lens position storage which stores a focus lens position at which the subject at the subject distance is focused on for each subject distance, and the method further includes: a step of adjusting parallax by performing relative image shift on the first viewpoint image and the second viewpoint image acquired respectively from the first imaging unit and the second imaging unit; a step of calculating a subject distance corresponding to a cross point, at which a light axis of the first imaging optical system crosses a light axis of the second imaging optical system after virtual change of the light axes, based on a shift amount of the image shift performed by the parallax adjustment unit; and a step of, when both the first lens position and the second lens position is not searched for within the first search range, reading out a lens position corresponding to the calculated subject distance from the lens position storage, and moving the first focus lens and the second focus lens to the read lens position.

According to the presently disclosed subject matter, taking advantage of a result of AF search in a first imaging unit, a search range of a second imaging unit is made narrow to perform AF search. Therefore, the AF search can be made short in total time required for it and made efficient, and focusing can be performed not affected by individual differences of the first and second imaging units.

Moreover, when an in-focus position of the first imaging unit cannot be searched for, the second imaging unit performs AF search within the same search range, the in-focus position of a first focus lens is calculated based on an in-focus position of a second focus lens acquired by this AF search and a preliminarily stored focus position displacement amount between the first and second focus lenses. Therefore, the first focus lens can be obtained not affected by individual differences of the first and second imaging units.

BRIEF DESCRIPTION OF THE DRAWINGS

FIG. 3A is a flowchart illustrating a first embodiment of an autofocus adjustment method according to the presently disclosed subject matter;

FIG. 8A is a flowchart illustrating a third embodiment of the autofocus adjustment method according to the presently disclosed subject matter;

DETAILED DESCRIPTION OF THE EMBODIMENTS

Embodiments of a three-dimensional imaging device and an autofocus adjustment method for the three-dimensional imaging device according to the presently disclosed subject matter will be described with reference to the accompanying drawings below.

[Appearance of Three-Dimensional Imaging Device]

Figure 1A:
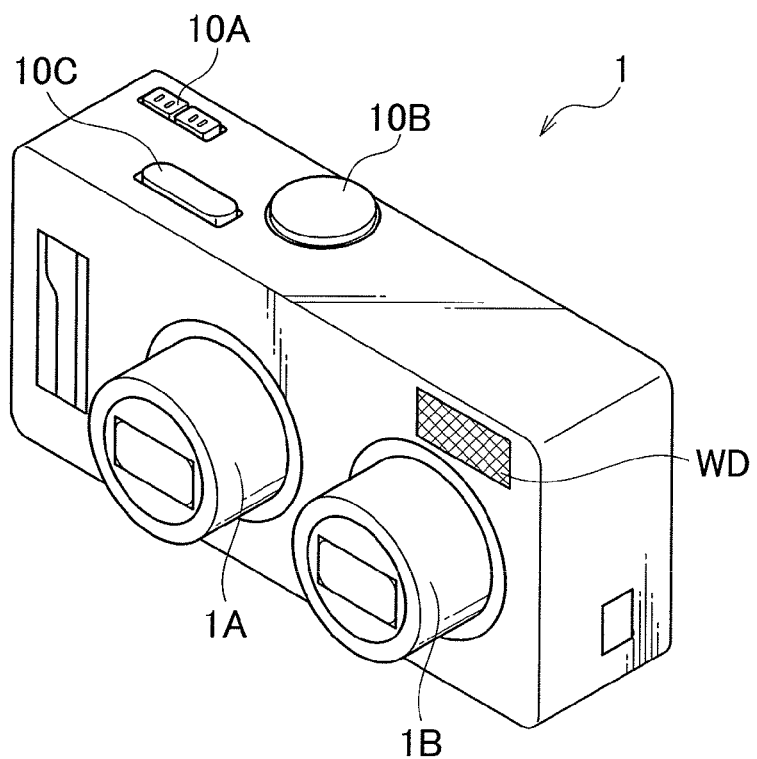
FIG. 1A is a front perspective view of a three-dimensional imaging device according to one embodiment of the presently disclosed subject matter.
Figure 1B:
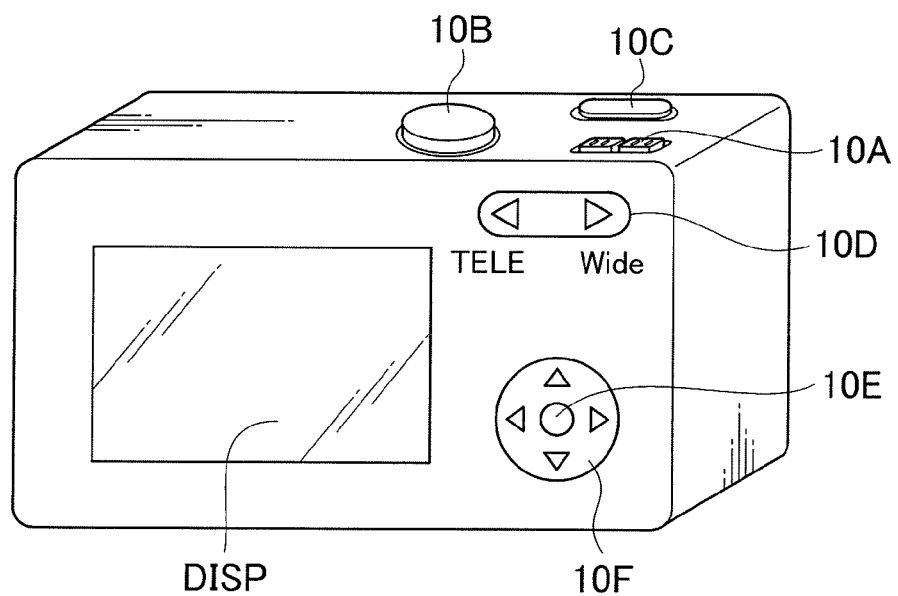
FIG. 1B is a rear perspective view of the three-dimensional imaging device according to one embodiment of the presently disclosed subject matter.

FIG. 1A and FIG. 1B are appearance views of a three-dimensional imaging device according to one embodiment of the presently disclosed subject matter. FIG. 1A is a perspective view seeing the three-dimensional imaging device 1 from the upside aside, and FIG. 1B is a perspective view seeing the three-dimensional imaging device 1 from the rear side.

As illustrated in FIG. 1A, the three-dimensional imaging device 1 is provided with two imaging units 1A and 1B. Hereinafter, these two imaging units are referred to as a first imaging unit 1A and a second imaging unit 1B distinguishingly.

The first imaging unit 1A and second imaging unit 1B are arranged side by side such that they can acquire image signals for three-dimensional view. These imaging units 1A and 1B generate image signals indicating viewpoint images (first viewpoint image and second viewpoint image) from two viewpoints of a right eye and a left eye, respectively. Upon manipulation of a power switch 10A on the upper face of the three-dimensional imaging device 1 in FIGS. 1A and 1B and manipulation of a shutter button 10C in the state where an imaging mode dial 10B is set to a mode such, for example, as a three-dimensional mode, image data for three-dimensional view are generated by the both imaging units 1A and 1B.

The shutter button 10C included in the three-dimensional imaging device 1 of this embodiment has two manipulation states of a half push and a full push. In this three-dimensional imaging device 1, a half push of the shutter button 10C results in performing exposure adjustment and focus adjustment, and a full push thereof results in imaging. Moreover, a flash emission window WD provided over the upper side of the imaging unit 1B is provided for a flash emitted toward the subject in the case where the luminance of field is dark.

Moreover, as illustrated in FIG. 1B, on the rear face of the three-dimensional imaging device 1, a liquid crystal monitor DISP capable of three-dimensional display is provided. This liquid crystal monitor DISP displays a three-dimensional image of the identical subject taken by the both imaging units 1A and 1B. In addition, the liquid crystal monitor DISP can employ an article using a lenticular lens or a parallax barrier, or an article capable of independently showing a right eye image and a left eye image by putting on dedicated glasses such as polarizing glasses and liquid crystal shutter glasses. Furthermore, manipulators such as a zoom switch 10D, a MENU/OK button 10E and a cross key 10F are disposed as well. Hereinafter, the power switch 10A, mode dial 10B, shutter button 10C, zoom switch 10D, MENU/OK button 10E, cross key 10F and the like is referred to as a manipulation unit 10 collectively in some cases.

[Internal Configuration of Three-Dimensional Imaging Device]

Figure 2:
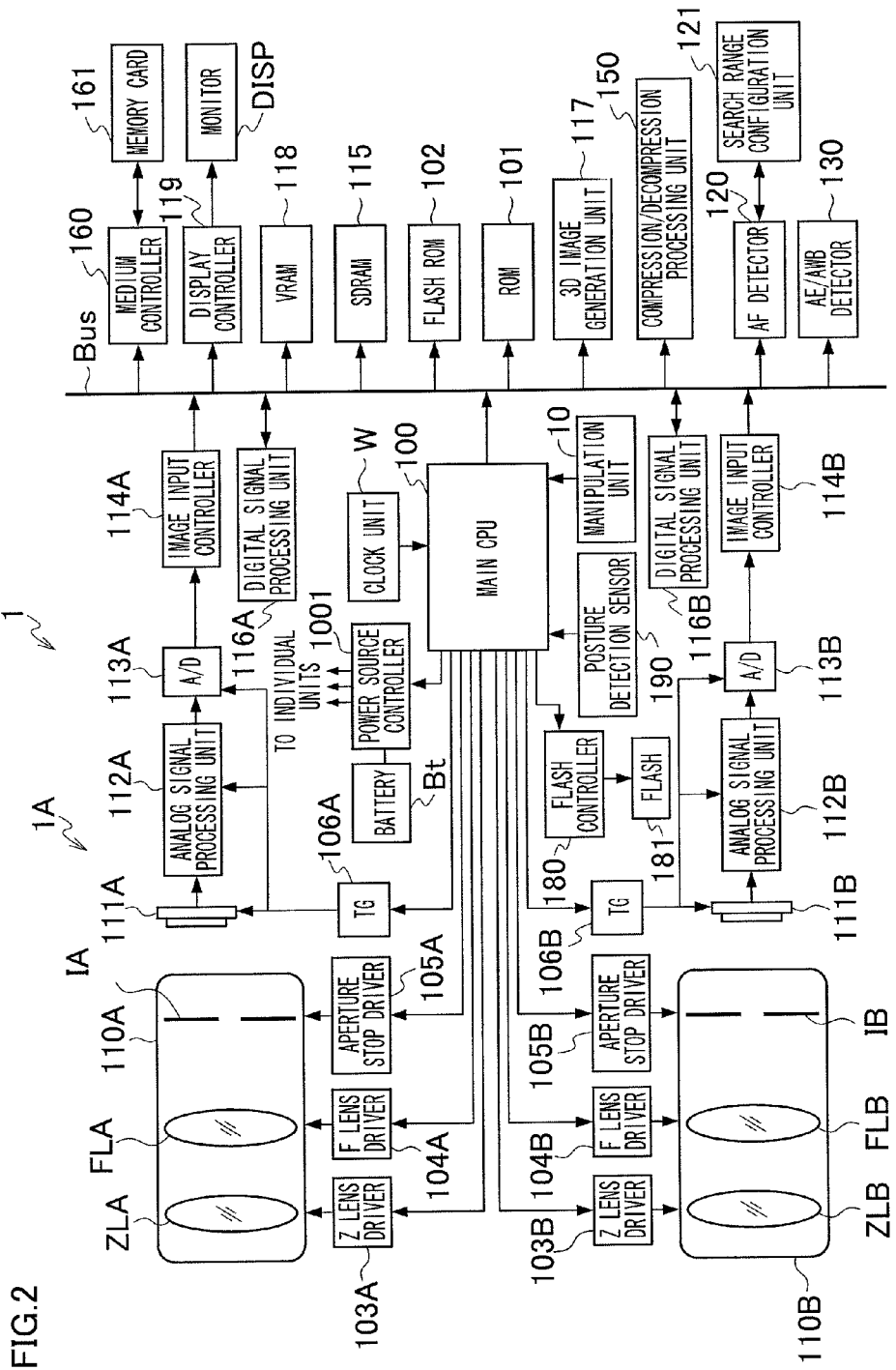
FIG. 2 is a block diagram illustrating an internal configuration of the three-dimensional imaging device in FIGS. 1A and 1B.

FIG. 2 is a block diagram illustrating an internal configuration of the three-dimensional imaging device 1 in FIGS. 1A and 1B. The internal configuration of the three-dimensional imaging device 1 is described with reference to FIG. 2.

Operations of this three-dimensional imaging device 1 are unifyingly controlled by a main CPU (central processing unit) 100.

To the main CPU 100, a ROM (read-only memory) 101 is connected via a bus Bus. The ROM 101 stores a program required for operating this three-dimensional imaging device 1 inside. According to procedures in the program, the main CPU 100 controls the operations of this three-dimensional imaging device 1 unifyingly.

At first, upon manipulation of the power switch 10A in the manipulation unit 10 illustrated in FIGS. 1A and 1B, the main CPU 100 controls the power source controller 1001 to supply electric power from a battery BT to individual units in FIG. 2 via the power source controller 1001 and to shift this three-dimensional imaging device 1 to the operational status. Thus, the main CPU 100 starts an imaging process. In addition, it is supposed that a processor such as a DSP (Digital Signal Processor) serves as an AF detector 120, a search range configuration unit 121, an AE/AWB detector 130, an image input controller 114A, a digital signal processing unit 116A and a 3D image generation unit 117 and that the main CPU 100 performs processes in association with the DSP.

Herein, the internal configuration of the first imaging unit 1A and second imaging unit 1B described with reference to FIGS. 1A and 1B previously is described with reference to FIG. 2. In addition, the wording "first" is attached to individual constituents of the first imaging unit 1A and the wording "second" is attached to individual constituents of the second imaging unit 1B in the following description.

The first imaging unit 1A is provided with a first imaging optical system 110A including a first focus lens FLA, a first focus lens driver (hereinafter referred to as first F lens driver) 104A moving the first focus lens FLA in the light axis direction, and a first imaging sensor 111A receiving the subject light obtained by imaging the subject through the first imaging optical system and generating an image signal representing the subject. The first imaging optical system 110A is provided also with a first aperture stop IA, and a first aperture stop driver 105A changing the aperture diameter of this first aperture stop IA.

Moreover, the first imaging optical system 100A is formed as a zoom lens, and is provided with a Z lens driver 103A performing control of setting the zoom lens to a predetermined focus distance. In addition, in FIG. 2, it is schematically indicated by one lens ZL that the whole imaging optical system is the zoom lens.

On the other hand, also similarly to the above-mentioned first imaging unit 1A, the second imaging unit 1B is provided with an imaging optical system including a second focus lens FLB, a second focus lens driver (hereinafter referred to as second F lens driver) 104B moving the second focus lens FLB in the light axis direction, and a second imaging sensor 111B receiving the subject light obtained by imaging the subject through the second imaging optical system and generating an image signal representing the subject.

These first imaging unit 1A and second imaging unit 1B generate image signals for three-dimensional view, that is, the first imaging unit 1A the image signal for the right eye, and the second imaging unit 1B the image signal for the left eye, respectively.

The first imaging unit 1A and second imaging unit 1B have the same configuration and only have a difference of generating the image signal for the right eye or the image signal for the left eye. A first A/D converter 113A and second A/D converter 113B perform the same signal processing of the image signals from the both imaging units also after converted into digital signals and guided to the bus Bus. Accordingly, hereinafter, the configuration of the first imaging unit 1A will be described along the flow of the image signal.

At first, the operation is described in the case where the subject which is taken by the first imaging unit 1A and second imaging unit 1B is displayed on the liquid crystal monitor DISP as a through-image as it is.

Upon the manipulation of the power switch 10A in the manipulation unit 10, the main CPU 100 controls the power source controller 1001 to supply electric power from the battery BT to the individual units and to shift this three-dimensional imaging device 1 to the operational status.

The main CPU 100, at first, controls the F lens driver 104A and aperture stop driver 105A to start exposure and focus adjustment, and furthermore, instructs a timing generator (TG) 106A to allow the imaging sensor 111A to configure an exposure time using an electronic shutter and to allow the imaging sensor 111A to output image signals to an analog signal processing unit 112A for every $\frac{1}{60}$ seconds.

The analog signal processing unit 112A receives the supply of timing signals from the TG 106A, receives the supply of the image signals from the imaging sensor 111A for every $\frac{1}{60}$ seconds, and performs noise reduction processing and the like. The analog image signals having undergone the noise reduction processing are supplied to the next A/D converter 113A. The A/D converter 113A performs conversion processing from the analog image signals to digital image signals for every $\frac{1}{60}$ seconds also synchronizing them with the timing signals from the TG 106A. Thus, the digital image signals converted and outputted by/from the A/D converter 113A are guided to the bus Bus by the image input controller 114A for every $\frac{1}{60}$ seconds, and the image signals thus guided to this bus Bus are stored in an SDRAM (synchronous dynamic random access memory) 115. The image signals are outputted from the imaging sensor 111A for every $\frac{1}{60}$ seconds, this leading to rewriting of content in this SDRAM 115 for every $\frac{1}{60}$ seconds.

The image signals stored in this SDRAM 115 are read out by the DSP serving as the AF detector 120, AE/AWB detector 130 and digital signal processing unit 116A for every $\frac{1}{60}$ seconds sequentially.

The AF detector 120 extracts high-frequency components of the image signals within a focus area (AF area) for every $\frac{1}{60}$ seconds while the main CPU 100 is controlling the F lens driver 104A to move the focus lens FLA, and integrates the high-frequency components to calculate an AF evaluation value indicating contrast of the image. The main CPU 100 acquires the AF evaluation value calculated by the AF detector 120 and allows the F lens driver 104A to move the first focus lens FLA at the lens position (in-focus position) at which the AF evaluation value is at its maximum. Therefore, even when the first imaging unit 1A is oriented in any direction, the focus is adjusted immediately and the subject substantially in focus is always displayed on the liquid crystal monitor DISP.

Moreover, the AE/AWB detector 130 detects subject brightness and calculates a gain configured for a white balance amplifier in the digital signal processing unit 116A for every $\frac{1}{60}$ seconds. According to the detection result of the brightness by this AE/AWB detector 130, the main CPU 100 controls the aperture stop driver 105A to change the aperture diameter of the aperture stop IA. Moreover, according to the detection result from the AE/AWB detector 130, the digital signal processing unit 116A configures the gain of the white balance amplifier.

This digital signal processing unit 116A performs processing on the image signals so as to be suitable for display. The image signals, which are converted so as to be suitable for display due to the signal processing of the digital signal processing unit 116A, are supplied to the 3D image generation unit 117, and the 3D image generation unit 117 generates the image signals for the right eye, which are used for display. The generated image signals for the right eye are stored in a VRAM (video Random Access Memory) 118.

The same operations as the operations until here are performed also in the second imaging unit 1B at the same timing. Therefore, two kinds of the image signals for the right eye and for the left eye are stored in the VRAM 118.

The main CPU 100 transfers the image signals for the right eye and the image signals for the left eye in the VRAM 118 to the display controller 119 to display the image on the liquid crystal monitor DISP. Display of the image signals for the right eye and the image signals for the left eye on the liquid crystal monitor DISP in FIGS. 1A and 1B allows human's eyes to see the image on the liquid crystal monitor DISP in a three-dimensional manner. The first and second imaging sensors 111A and 111B output the image signals for every $\frac{1}{60}$ seconds as one example. Thereby, the image signals in the VRAM 118 are rewritten for every $\frac{1}{60}$ seconds as one example, and the three-dimensional image on the liquid crystal monitor DISP is also rewritten for every $\frac{1}{60}$ seconds to be displayed, this allowing the three-dimensional image to be displayed as a motion picture.

Herein, when the subject on the liquid crystal monitor DISP is referred and the shutter button 10C in the manipulation unit 10 undergoes a half push operation. The main CPU 100 receives an AE value detected in the AE/AWB detector 130 immediately before the shutter button 10C undergoes a full push, and allows the first and second aperture stop drivers 105A and 105B to give the first and second aperture stops IA and IB an aperture stop diameter according to the AE value, and, while the first F lens driver 104A is being allowed to move the first focus lens FLA within a first search range, allows the AF detector 120 to calculate the AF evaluation value.

The main CPU 100 detects a lens position of the first focus lens FLA at which the AF evaluation value is at its maximum (hereinafter referred to as "first lens position P1") based on the AF evaluation value calculated by the AF detector 120, and allows the first focus lens FLA to move to the first lens position P1.

On the other hand, as to the second imaging optical system, the main CPU 100 allows the second focus lens FLB to move within a second search range narrower than the first search range, and allows the AF detector 120 to calculate the AF evaluation value. The main CPU 100 receives the AF evaluation value from the AF detector 120, detects a lens position of the second focus lens FLB at which the AF evaluation value is at its maximum (hereinafter referred to as "second lens position P2"), and allows the second focus lens FLB to move to this second lens position P2.

Although the details will be described later, in this stage, the AF detector 120 allows the search range configuration unit 121 to calculate the second search range, which is narrower than the first search range, around the lens position corresponding to the first lens position P1 of the first focus lens based on the first lens position P1 of the first focus lens FLA and data indicating a search range read out from the flash ROM 102 (proximal deviation N and distal deviation F). Then, the main CPU 100 receives the calculation result of the second search range, and allows the second F lens driver 104B to perform AF search for searching for the second lens position P2 (in-focus position) within the second search range.

Thus, the focus lens FLA of the first imaging unit 1A is allowed to perform conventional AF search, and the second imaging unit 1B is allowed to perform AF search within the second search range, which is narrower than the first search range, including the lens position corresponding to the lens position of the first focus lens. Thereby, time for the AF search using the second focus lens FLB can be reduced.

Then, upon a full push of the shutter button 10C, the main CPU 100 allows the first and second TG 106A and 106B to perform exposure of the first imaging sensor 111A and second imaging sensor 111B during a predetermined shutter speed and allows them to imaging a still image. The main CPU 100 allows the first and second imaging sensors 111A and 111B to output the image signals to the first and second analog signal processing units 112A and 112B at the off-timing of the electronic shutter, and allows the first and second analog signal processing units 112A and 112B to perform noise reduction processing. After that, the first and second A/D converters 113A and 113B are allowed to convert the analog image signals into the digital image signals.

Herein, according to instruction of the main CPU 100, the first and second image input controllers 114A and 114B once allow the SDRAM 115 via the bus Bus to store the digital image signals converted by the first and second A/D converters 113A and 113B. After that, the digital signal processing units 116A and 116B read out the image signal in the SDRAM 115, and perform image processing such as white balance correction, gamma correction, synchronization processing which interpolates spatial displacement of color signals such as R, G and B along with a color filter array of a single plate CCD and matches places of individual color signals, contour correction, and generation of luminance/chromaticity signals (YC signals) to send to the 3D image generation unit 117.

Subsequently, the main CPU 100 supplies the image signal for the right eye and the image signal for the left eye in the image generation unit 117 using the bus Bus to the compression/decompression processing unit 150. After allowing this compression/decompression processing unit 150 to compress the image data, the main CPU 100 transfers the image data thus compressed to the media controller 160 using the bus Bus, supplies header information according to the compression and imaging to the media controller 160, allows the media controller 160 to generate an image file in a predetermined format (for example, a 3D still image is an image file in an MP (multipicture) format), and allows the memory card 161 to record the image file.

In the configuration of this embodiment, even when there are individual differences between the first imaging unit 1A and second imaging unit 1B, AF search is performed for each and the first and second focus lenses FLA and FLB are allowed to move to the first lens position P1 and second lens position P2 in focus, respectively. Because of this, such individual differences can be compensated, and moreover, time for AF processing including AF search of the second focus lens FLB of the second imaging optical system can be reduced.

In addition, in FIG. 2, a flash controller 180, a flash 181 emitting a flash from the light emission window WD in FIGS. 1A and 1B according to instruction from the flash controller 180, a clock unit W for detecting the present time, and further, a posture detection sensor 190 detecting posture of this three-dimensional imaging device 1 are illustrated.

First Embodiment

Next, a first embodiment of the autofocus adjustment method according to the presently disclosed subject matter is described with reference to a flowchart illustrated in FIG. 3A and FIG. 3B.

In FIG. 3A, the main CPU 100 determines whether the shutter button 10C is at a half push (step S10). In this step S10, when the main CPU 100 determines that the shutter button 10C is not at a half push, the process proceeds to the No side and repeats the step in step S10, and in this step S10, when it is determined that the shutter button 10C is at a half push, the process proceeds to the Yes side. Then, proceeding to the Yes side, in step S12, the AE/AWB detector 130 in the DSP starts the AE operation according to imaging preparation instruction from the main CPU 100, and further proceeding to step S14, where the AF detector 120 in the DSP starts the AF operation.

Upon the start of the AF operation in step S14, in step S16, the main CPU 100, at first, configures the first search range of the first focus lens FLA.

Figure 4A:
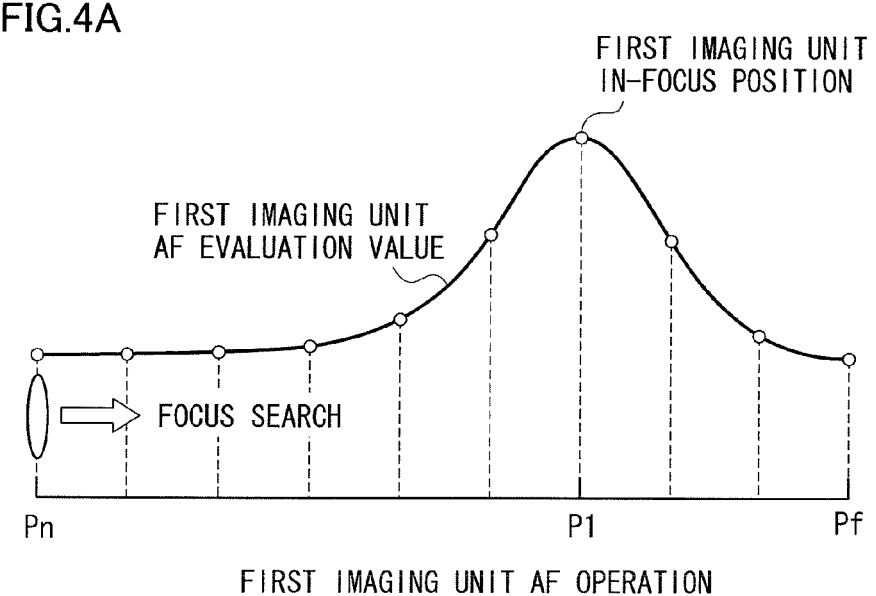
FIG. 4A is a diagram illustrating a first search range of a first focus lens and a relation between each search position (horizontal axis) and AF evaluation value (vertical axis)

FIG. 4A is a diagram illustrating the first search range of the first focus lens FLA and relation between individual search positions (individual lens positions of the first focus lens FLA) and AF evaluation values (vertical axis).

As illustrated in FIG. 4A, the first search range is from a close end (Pn) to an infinite end (Pf), for example. In addition, since a movement range of the focus lens differs depending on zoom magnification, the search range is configured as a different range depending on the zoom magnification.

Subsequently, in step S18, the main CPU 100 moves the first focus lens FLA of the first imaging optical system within the above-mentioned first search range, and allows the AF detector 120 to acquire the AF evaluation value every time when the first focus lens FLA reaches predetermined lens positions (at every time of driving by a predetermined pulse number in the case of pulse driving of the focus lens FLA).

Next, it is determined whether or not the first in-focus position (lens position) P1 of the first focus lens FLA which comes in focus on the subject in the AF area can be detected based on the AF evaluation values thus acquired (step S20). For example, in the case that the image has low contrast, and as a result, any of the above-mentioned acquired AF evaluation values does not reach a predetermined value, or in the case of monotonic increase or monotonic decrease (in the case of no peak), it is determined that the in-focus position cannot be detected.

When it is determined that the first in-focus position can be detected, based on a plurality of lens positions in the vicinity of the lens position, at which the acquired AF evaluation value is at its maximum, including itself and their AF evaluation values, an approximate curve of the AF evaluation values which passes through the individual AF evaluation values is calculated, and the lens position P1 at which the approximate curve takes its maximum is acquired as the first in-focus position (step S22). In addition, during the AF search within the above-mentioned first search range, the search operation may be stopped upon decrease of the AF evaluation value after increase of the AF evaluation value, and the lens position P1 at which the AF evaluation value is at its maximum may be calculated as mentioned above.

In the next step S24, the AF detector 120 supplies the lens position P1 to the search range configuration unit 121, reads out search start position data N and search end position data F from the flash ROM 102 to supply to the search range configuration unit 121, and allows the search range configuration unit 121 to configure the second search range, which is narrower than the first search range, around the lens position P1.

Figure 4B:
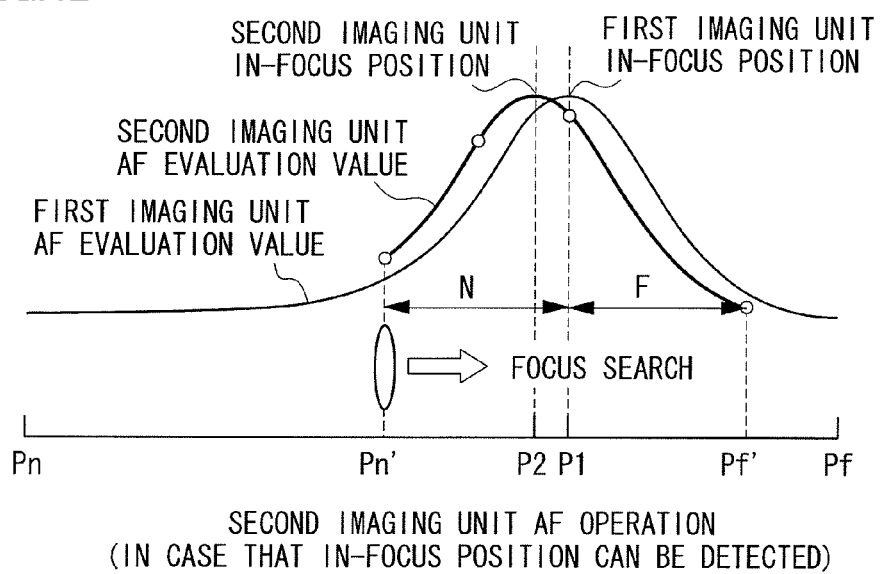
FIG. 4B is a diagram illustrating a second search range of a second focus lens and a relation between each search position (horizontal axis) and AF evaluation value (vertical axis)

When Pn' denotes a search start position and Pf denotes a search end position as illustrated in FIG. 4B, this second search range is configured as indicated by the following equations.

$$Pn'=P1+N, Pf'=P1-F \quad \{\text{Expression 1}\}$$

Subsequently, the main CPU 100 allows the second focus lens FLB to move within the configured second search range, and allows the AF detector 120 to acquire the AF evaluation values every time when the second focus lens FLB reaches predetermined lens positions (step S26). Then, similarly to the acquisition of the first lens position P1, based on a plurality of lens positions in the vicinity of the lens position, at which the AF evaluation value acquired in step S26 is at its maximum, including itself and their AF evaluation values, an approximate curve of the AF evaluation values which passes through the individual AF evaluation values is calculated, and the second lens position P2 corresponding to the maximum value on the approximate curve is acquired as the in-focus position (step S28).

Figure 3B:
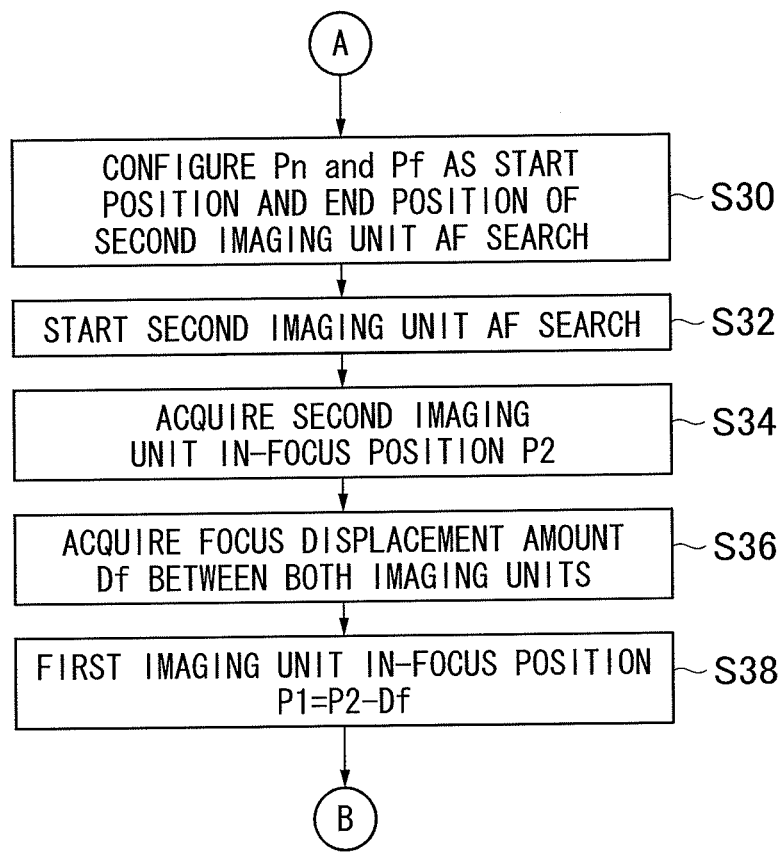
FIG. 3B is a flowchart illustrating the first embodiment of the autofocus adjustment method according to the presently disclosed subject matter (continued)

On the other hand, in step S20, when it is determined that the in-focus position cannot be detected, the process proceeds to step S30 illustrated in FIG. 3B.

Figure 5:
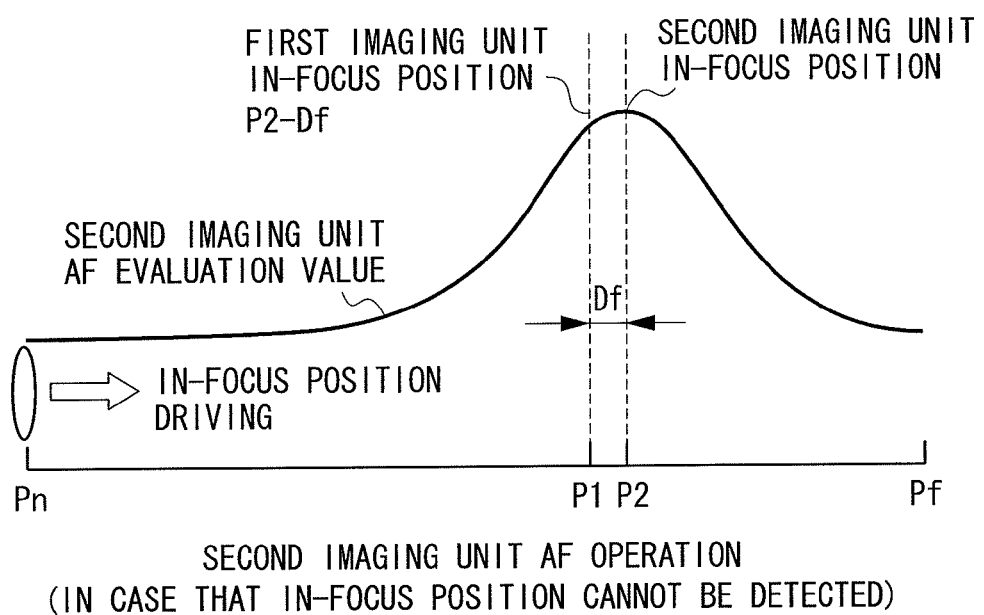
FIG. 5 is a diagram used for explaining a method of calculating an in-focus position P1 of the first focus lens from an in-focus position P2 of the second focus lens.

In step S30, as illustrated in FIG. 5, the first search range of the second focus lens FLB (for example, from a close end (Pn) to an infinite end (Pf)) is configured. This first search range is same as the first search range of the first focus lens FLA configured in step S16.

Subsequently, in step S32, the main CPU 100 moves the second focus lens FLB of the second imaging optical system within the above-mentioned first search range, and allows the AF detector 120 to acquire the AF evaluation value every time when the second focus lens FLB reaches predetermined lens positions. After that, based on a plurality of lens positions in the vicinity of the lens position, at which the acquired AF evaluation value is at its maximum, including itself and their AF evaluation values, an approximate curve of the AF evaluation value which passes through the individual AF evaluation values is calculated, and the lens position P2 at which the approximate curve takes its maximum is acquired as the second in-focus position (step S34).

Next, a focus position displacement amount Df between the lens position of the first focus lens FLA and the lens position of the second focus lens FLB in the case of focusing on the subject at the same distance (for example, a value obtained by subtracting a pulse number corresponding to the lens position of the first focus lens FLA from a pulse number corresponding to the lens position of the second focus lens FLB) is read out from the flash ROM 102 (step S36).

In addition, it is supposed that the focus position displacement amount Df between the lens position of the first focus lens FLA and the lens position of the second focus lens FLB in the case of focusing on the subject at the same distance is preliminarily detected in adjustment before shipping and that this detected value is stored in the flash ROM 102.

Moreover, this focus position displacement amount Df is different depending on the zoom magnification (zoom position) of the zoom lens, and therefore, stored in the flash ROM 102 by being detected for each zoom position. Accordingly, in step S36, the corresponding focus position displacement amount Df is read out based on the present zoom position of the zoom lens.

Next, as illustrated in FIG. 5, based on the second lens position P2 searched for due to the AF search of the second focus lens FLB and the focus position displacement amount Df acquired in step S36, the in-focus position (first lens position) P1 of the first focus lens FLA is calculated according to the following equation (step S38).

$$P1=P2-Df \quad \{\text{Expression 2}\}$$

After the end of the step in step S38, the process proceeds to step S40 in FIG. 3A.

In step S40, when the first lens position P1 of the first focus lens FLA has been searched for within the first search range, the first focus lens FLA and second focus lens FLB are allowed to move to the first lens position P1 and second lens position P2 acquired in step S22 and step S28, respectively, and on the other hand, when the first lens position P1 of the first focus lens FLA has not been searched for within the first search range, the first focus lens FLA and second focus lens FLB are allowed to move to the first lens position P1 calculated in step S38 and the second lens position P2 acquired in step S34, respectively. Thereby, the AF operation is ended (step S42).

After the above-mentioned AF operation is ended, the main CPU 100 determines whether or not the shutter button 10C is at a full push (step S44). In this step S44, when the main CPU 100 determines that the shutter button 10C is not at a full push, the process proceeds to the No side and repeats the step in step S44, and when it is determined that the shutter button 10C is at a full push, the process proceeds to the Yes side, imaging process is performed (step S46), and the process of this flow is ended.

In addition, the second search range of the first embodiment, which is configured backward by N and forward by F around the first lens position P1, can be determined in consideration of the focus position displacement amount Df between the first focus lens FLA and second focus lens FLB, and the variation due to temperature, posture and the like (search margin), for example. Moreover, in the first embodiment, the search range is configured around the first lens position P1, whereas the second search range may be configured around the first lens position P1 corrected using the focus position displacement amount Df (corresponding to the second lens position P2). According to this, the second search range can be made narrower.

Second Embodiment

Next, a second embodiment of the autofocus adjustment method according to the presently disclosed subject matter is described with reference to a flowchart illustrated in FIG. 6A and FIG. 6B. In addition, in FIG. 6A and FIG. 6B, the common portions to the flowchart of the first embodiment illustrated in FIG. 3A and FIG. 3B are provided with the same step numbers and their detailed description is omitted.

Figure 6A:
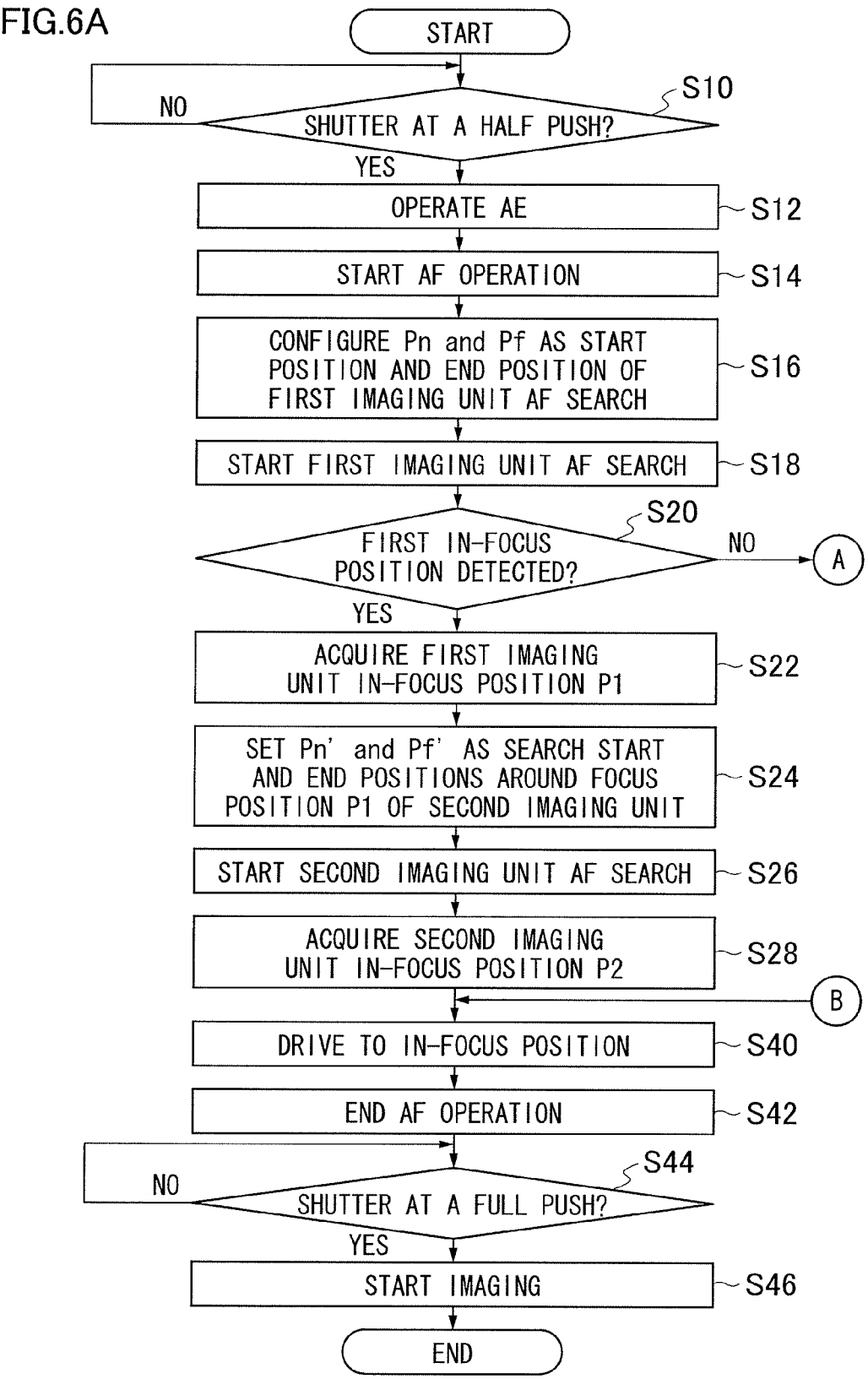
FIG. 6A is a flowchart illustrating a second embodiment of the autofocus adjustment method according to the presently disclosed subject matter.
Figure 6B:
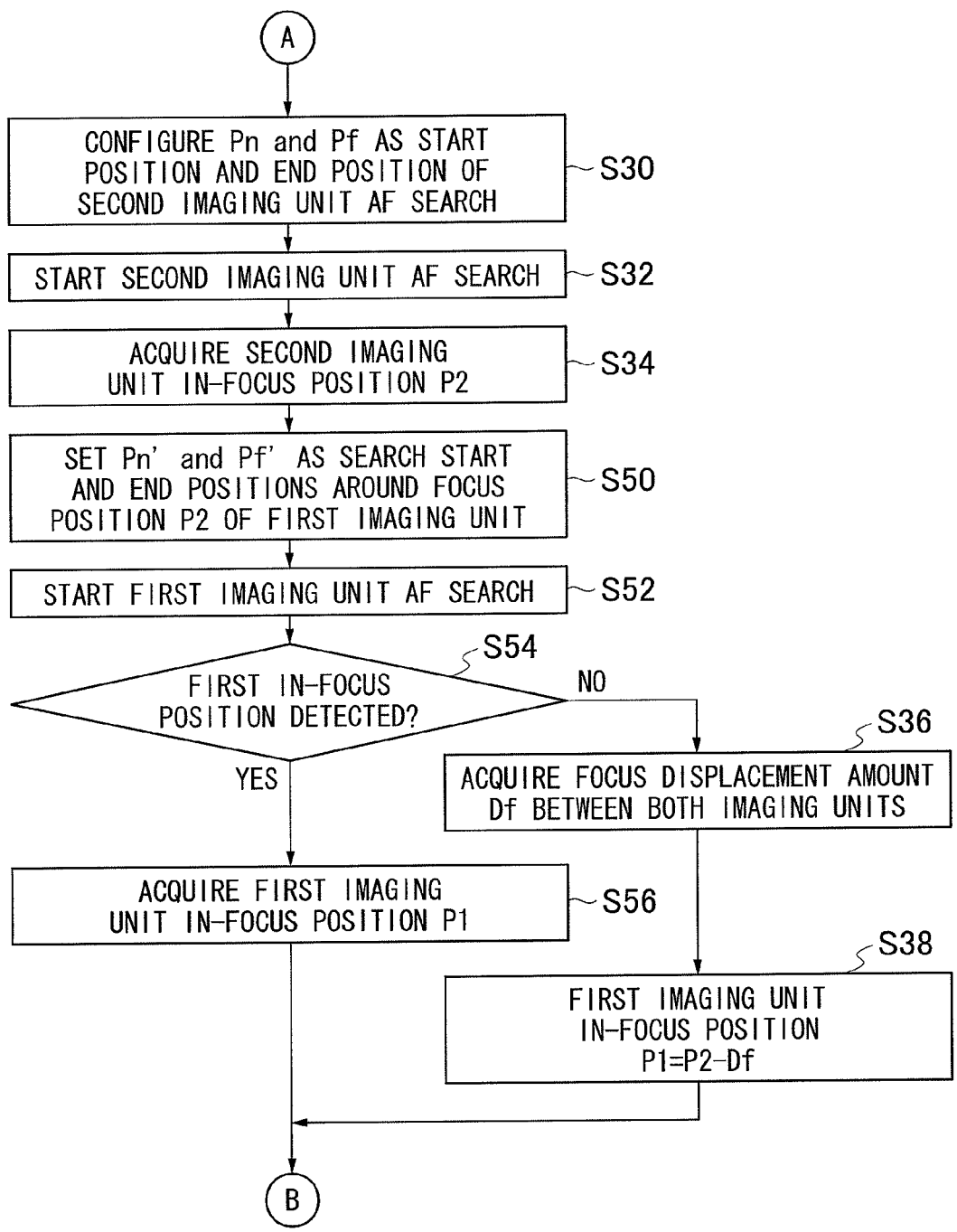
FIG. 6B is a flowchart illustrating the second embodiment of the autofocus adjustment method according to the presently disclosed subject matter (continued)

As to the second embodiment illustrated in FIG. 6A and FIG. 6B, processes in FIG. 6B are different from the processes in FIG. 3B, and especially, adding processes of step S50, step S52, step S54 and step S56 downstream of step S34, they are different from the processes in FIG. 3B.

Namely, the in-focus position (second lens position) P2 of the second focus lens FLB is acquired in step S34 in FIG. 6B, and after that, similarly to the process in step S24, the second search range, which is narrower than the first search range is configured (step S50).

When Pn' denotes a search start position and Pf denotes a search end position, this second search range is configured as indicated by the following equations (see, FIG. 4B).

$$Pn'=P2+N, Pf'=P2-F \quad \{\text{Expression 3}\}$$

Subsequently, the main CPU 100 moves the first focus lens FLA within the configured second search range, and allows the AF detector 120 to acquire the AF evaluation values every time when the first focus lens FLA reaches predetermined lens positions (step S52). Then, the main CPU 100 determines whether or not the first in-focus position (lens position) P1 of the first focus lens FLA which comes in focus on the subject in the AF area can be detected based on the AF evaluation value thus acquired (step S54).

When it is determined that the first in-focus position can be detected, based on a plurality of lens positions in the vicinity of the lens position, at which the acquired AF evaluation value is at its maximum, including itself and their AF evaluation values, the main CPU 100 calculates an approximate curve of the AF evaluation values which passes through the individual AF evaluation values, and acquires the lens position P1, at which the approximate curve takes its maximum, as the first in-focus position (step S56).

In addition, in step S20, even when it is determined that the first in-focus position cannot be detected during the AF search within the first search range, there is a chance that the first in-focus position can be detected during re-search within the second search range. This is because a chronologically different image signal is acquired from the first imaging unit 1A during the re-search, and as a result, an AF evaluation value is different. Moreover, within the second search range, there is high possibility of the presence of the first in-focus position of the first focus lens FLA. Therefore, in re-search within this second search range, a threshold for determining whether or not the in-focus position can be detected may be configured lower than in the case of the first search range.

On the other hand, in step S54, when it is determined that the first in-focus position of the first focus lens FLA cannot be detected during the re-search within the second search range, the process proceeds to step S36, where the first in-focus position (lens position P1) is calculated similarly to the first embodiment.

Variation of Second Embodiment

Figure 7:
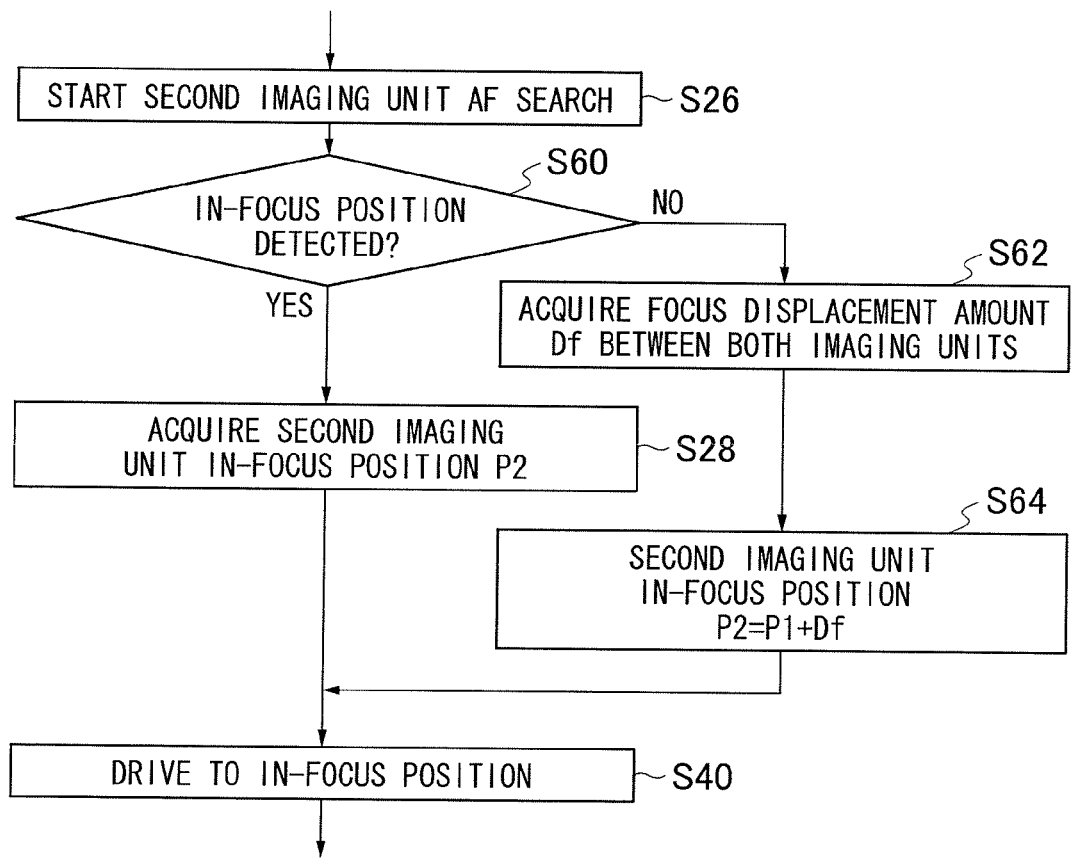
FIG. 7 is a flowchart of the essential portion illustrating a variation of the second embodiment of the autofocus adjustment method according to the presently disclosed subject matter.

FIG. 7 is a flowchart of the essential portion illustrating a variation of the second embodiment. Hereinafter, only differences from the second embodiment are described.

In the second embodiment illustrated in FIG. 6A and FIG. 6B, only the case that the second in-focus position of the second focus lens FLB is acquired in step S28 is described, whereas in the variation of the second embodiment illustrated in FIG. 7, processes in the case that the second in-focus position of the second focus lens FLB cannot be searched for are added.

Namely, as illustrated in FIG. 7, in the variation of the second embodiment, step S60 is added between step S26 and step S28 in FIG. 6A, and further, step S62 and step S64 branching from step S60 are added.

In step S60, it is determined whether or not the second in-focus position (lens position) P2 of the second focus lens FLB which comes in focus on the subject in the AF area can be detected based on the AF evaluation values acquired in step S26. When it is determined that the second in-focus position can be detected, the process proceeds to step S28, and when it is determined that it cannot be detected, the process proceeds to step S62.

In step S62, the focus position displacement amount Df between the lens position of the first focus lens FLA and the lens position of the second focus lens FLB in the case of focusing on the subject at the same distance is read out from the flash ROM 102. Then, based on the first lens position P1 searched for due to the AF search of the first focus lens FLA and the focus position displacement amount Df read out from the flash ROM 102 corresponding to this first lens position P1, the in-focus position (second lens position) P2 of the second focus lens FLB is calculated according to the following equation (step S64).

$$P2 = P1 + Df \quad \{\text{Expression 4}\}$$

After the end of the step in step S64, the process proceeds to step S40.

Thereby, when the in-focus position of the second lens position is not found within the second search range, now the second lens position P2 can be calculated according to the above-mentioned equation indicated by Expression 4.

Third Embodiment

Next, a third embodiment of the autofocus adjustment method according to the presently disclosed subject matter is described with reference to a flowchart illustrated in FIG. 8A and FIG. 8B. In addition, in FIG. 8A and FIG. 8B, the common portions to the flowchart of the first embodiment illustrated in FIG. 3A and FIG. 3B are provided with the same step numbers and their detailed description is omitted.

Figure 8B:
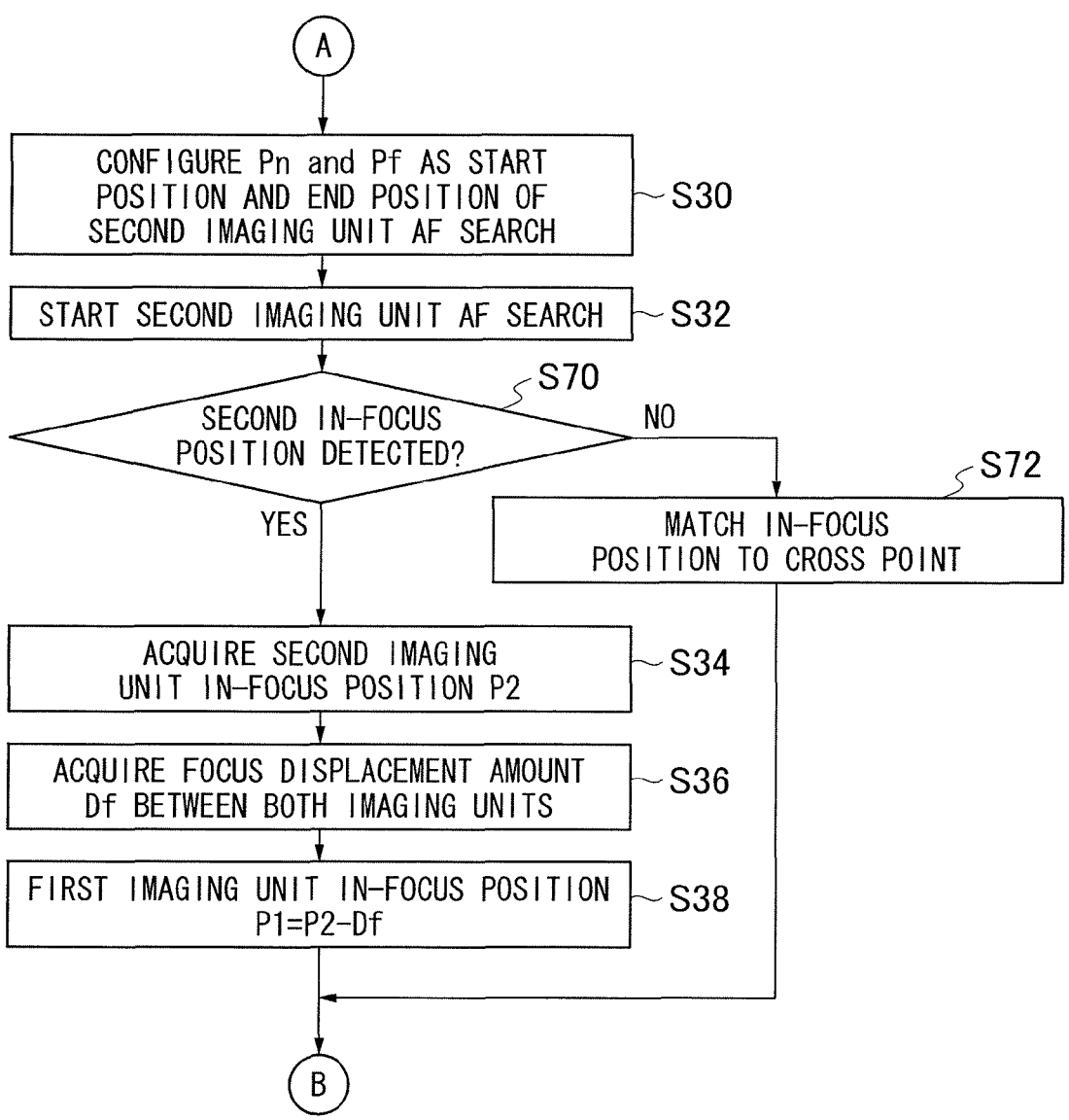
FIG. 8B is a flowchart illustrating the third embodiment of the autofocus adjustment method according to the presently disclosed subject matter (continued)

As to the third embodiment illustrated in FIG. 8A and FIG. 8B, processes in FIG. 8B are different from the processes in FIG. 3B, and especially, adding step S70 downstream of step S32 and further adding step S72 branching from step S70, they are different from the processes in FIG. 3B.

Namely, it is determined whether or not the second in-focus position (lens position) P2 of the second focus lens FLB which comes in focus on the subject in the AF area can be detected based on the AF evaluation values acquired in step S32 in FIG. 8B (step S70).

When it is determined that the second in-focus position can be detected in step S70, the process proceeds to step S34, where the processes similar to the first embodiment are performed.

On the other hand, when it is determined that the second in-focus position cannot be detected in step S70, the process proceeds to step S72, where the first focus lens FLA and second focus lens FLB are allowed to move respectively to a preliminarily configured first lens position P1 and second lens position P2 at which the subject at the subject distance corresponding to a cross point is focused on.

Herein, the cross point is a point at which a light axis of the first imaging optical system 110A crosses a light axis of the second imaging optical system 110B (congestion point), and in the case of this three-dimensional imaging device 1, the distance to the cross point is adjusted to become 2000 mm.

In addition, it is supposed that the lens position of the first focus lens FLA and the lens position of the second focus lens FLB in the case of focusing on the subject at the cross point are preliminarily detected in adjustment before shipping and that these detected lens positions are stored in the flash ROM 102. Moreover, only the lens position of any one of the first focus lens FLA and second focus lens FLB may be stored, and the other lens position may be calculated based on the lens position thus stored and the focus position displacement amount Df corresponding to the lens position.

According to this third embodiment, when both in-focus positions of the first focus lens FLA and second focus lens FLB cannot be searched for, the first focus lens FLA and second focus lens FLB are allowed to move so as to focus on the subject at the cross point position. Therefore, in the case that the essential subject is present at this cross point or in the vicinity thereof, the left eye image and right eye image suitable for three-dimensional view, which are focused on the essential subject, can be acquired. In addition, the subject image of the subject at the distance of the cross point hardly causes a parallax amount and, therefore, does not cause excess three-dimensional feeling. For this reason, the user can reduce a chance of suffering from discomfort on the occasion of the three-dimensional view of the subject image of the subject at the distance of the cross point.

Variation of Third Embodiment

Figure 9:
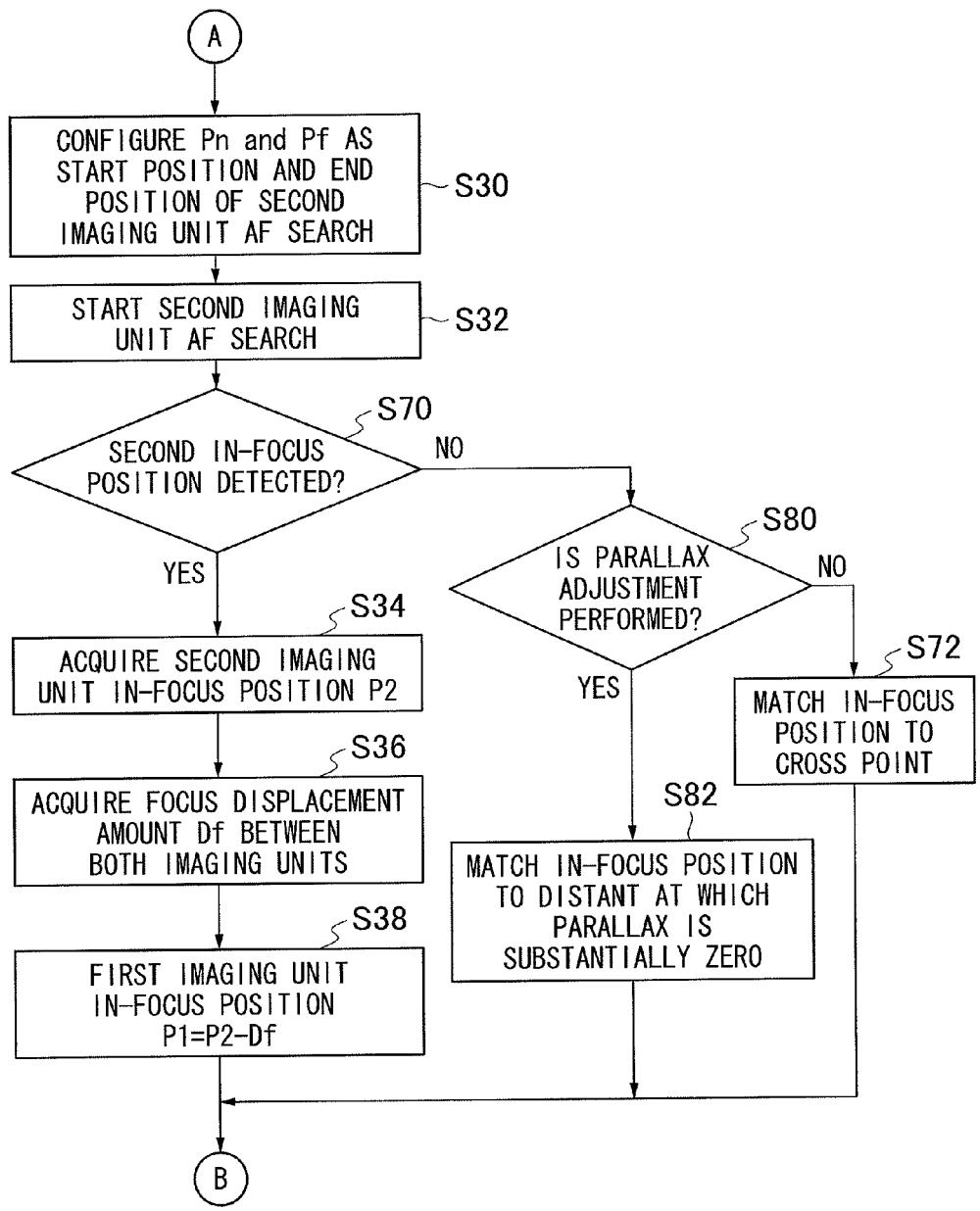
FIG. 9 is a flowchart of the essential portion illustrating a variation of the third embodiment of the autofocus adjustment method according to the presently disclosed subject matter.

FIG. 9 is a flowchart of the essential portion illustrating a variation of the third embodiment. Hereinafter, only differences of the variation of the third embodiment from the third embodiment are described.

The variation of the third embodiment is different from the third embodiment in performing processes illustrated in FIG. 9 instead of the processes illustrated in FIG. 8B for the third embodiment.

Namely, in the flowchart illustrated in FIG. 9, step S80 and step S82 are added compared with the flowchart illustrated in FIG. 8B.

In step S80 in FIG. 9, it is determined whether or not parallax adjustment between a left image and a right image for three-dimensional view is performed.

Figure 10C:
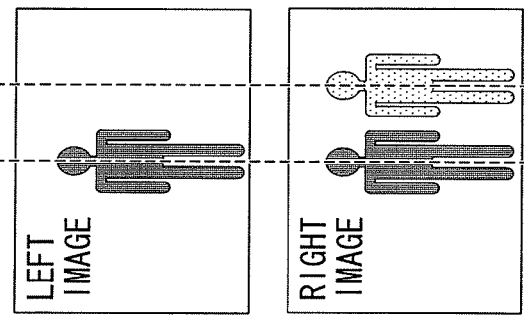
FIG. 10C is a diagram used for explaining the parallax adjustment.
Figure 10B:
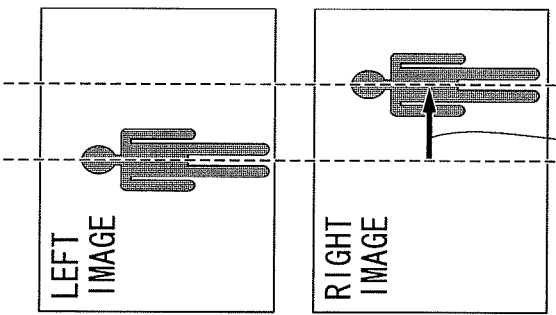
FIG. 10B is a diagram used for explaining the parallax adjustment.
Figure 10A:
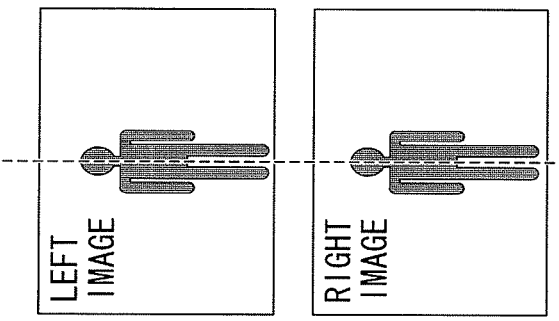
FIG. 10A is a diagram used for explaining parallax adjustment.

FIG. 10A to FIG. 10C are diagrams for explaining the parallax adjustment. As illustrated in FIG. 10A, when the subject is present at the cross point position, parallax of the subject between the left image and right image hardly arises. On the other hand, as illustrated in FIG. 10B, when the subject positions on the far side (INF side) relative to the cross point position, the position of the subject in the right image shifts to the right side compared with the position of the subject in the left image. Conversely, when the subject positions on the close side relative to the cross point position, the position of the subject in the right image shifts to the left side compared with the position of the subject in the left image.

Namely, when the subject goes away or comes closer from the cross point position, according to that distance, horizontal parallax of the subject between the left image and right image becomes larger, and excess depth feeling or floating feeling in the three-dimensional image arises. Accordingly, for the suitable three-dimensional view, parallax adjustment according to the subject distance is essential.

This parallax adjustment includes manual parallax adjustment of adjusting a cut-out position (offset value) between the left image and right image to perform image shift in response to manipulation of the parallax adjustment button in the manipulation unit 10 and automatic parallax adjustment of detecting a parallax amount of the essential subject and configuring an offset value such that the parallax amount becomes zero to perform image shift.

As illustrated in FIG. 10C, the manual parallax adjustment is performed by, while seeing the right and left images (three-dimensional image) displayed on the liquid crystal monitor DISP as a through-image, manipulating the parallax adjustment button. In addition, this manual adjustment is not limited to the case of the parallax adjustment which is performed so as to match the positions of the essential subject, but any adjustment according to the user's preference of three-dimensional view can be performed appropriately.

Figure 11A:
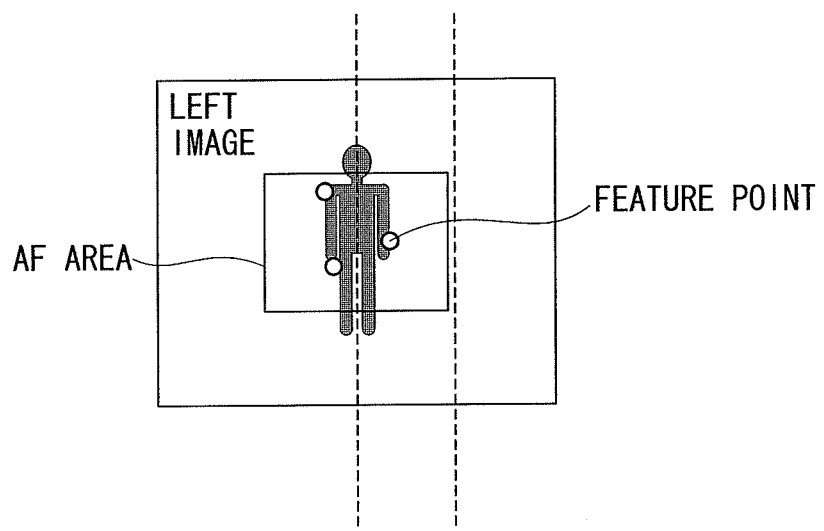
FIG. 11A is a diagram used for explaining automatic detection of a parallax amount.
Figure 11B:
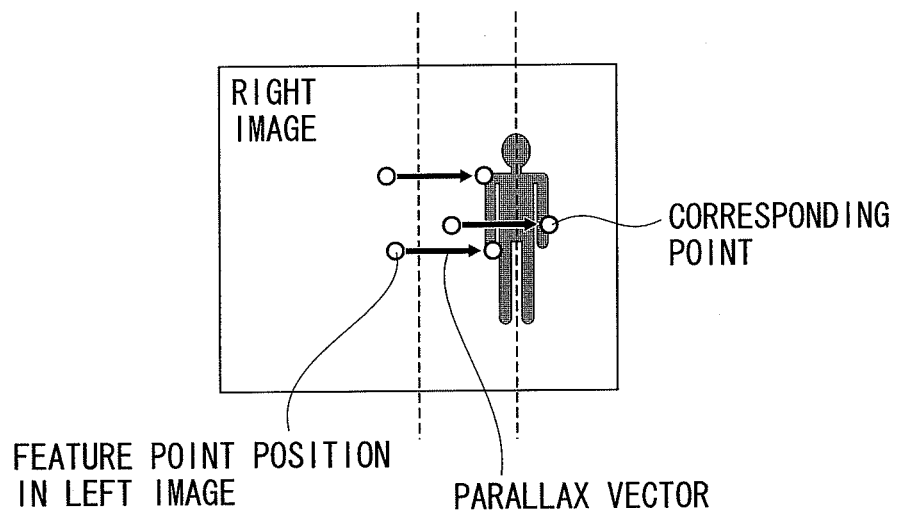
FIG. 11B is a diagram used for explaining the automatic detection of the parallax amount.

Moreover, as illustrated in FIG. 11A, the automatic parallax adjustment is performed by extracting feature points of the image (subject) within the AF area of the left image, detecting feature points in the right image corresponding to the extracted feature points, and obtaining parallax vectors each formed between the feature points corresponding each other (FIG. 11B). The representative value of the obtained parallax vectors (average, median, mode or the like) is set as a parallax amount, and the offset value is configured such that the parallax amount becomes zero. Thereby, the image shift in which the parallax amount becomes zero is performed.

Returning to FIG. 9, in step S80, it is determined whether or not the parallax adjustment is performed according to whether or not the parallax adjustment is performed by the above-mentioned manual parallax adjustment or automatic parallax adjustment (that is, whether the offset value is zero or not).

When it is determined that the parallax adjustment is not performed, similarly to the third embodiment, the first focus lens FLA and second focus lens FLB are allowed to move to the lens positions at which the subject at the preset cross point (distance of 2000 mm) is focused on (step S72).

On the other hand, when it is determined that the parallax adjustment is performed, the first focus lens FLA and second focus lens FLB are allowed to move to the lens positions at which the parallax amount is substantially zero and the subject is focused on (step S82).

Figure 12:
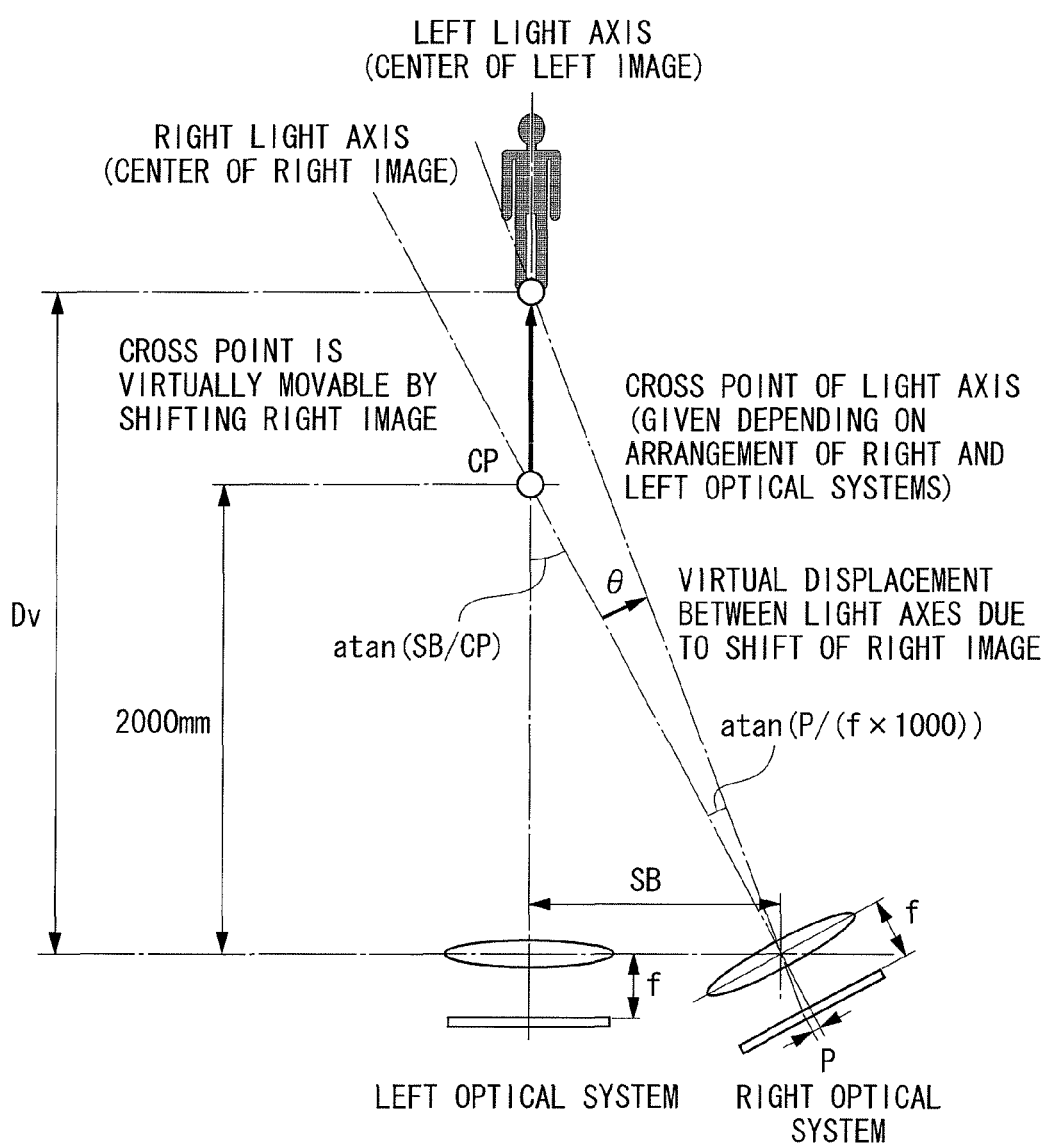
FIG. 12 is a diagram used for explaining a virtual cross point in case of the parallax adjustment.

Now, as illustrated in FIG. 12, when the subject positions on the far side relative to the cross point CP, the subject distance Dv at which the parallax amount after parallax adjustment is substantially zero (distance to the virtual cross point) can be calculated by the following equation.

$$Dv = SB \times \tan\{90° - a\tan(SB/CP) + a\tan(P/(f \times 1000))\} \quad \{\text{Expression 5}\}$$

where
CP: distance to the cross point (in mm unit)
SB: stereo base (horizontal distance between imaging system light axes: in mm unit)
f: focus distance (in mm unit)
P: parallax adjustment amount=(image shift pixel number pixel pitch: in μm unit)
Dv: distance to the virtual cross point (unit: mm)

In step S82, based on the distance Dv to the virtual cross point calculated by the above-mentioned equation indicated by Expression 5 and the zoom position of the zoom lens (focus distance f), from the flash ROM 102 preliminarily storing the lens positions of the first focus lens FLA and second focus lens FLB, at which the subject at the subject distance is focused on, for each subject distance and zoom position, the corresponding lens positions are read out. The first focus lens FLA and second focus lens FLB are allowed to move to the lens positions thus read out.

According to this variation of the third embodiment, when both in-focus position of the first focus lens FLA and second focus lens FLB cannot be searched for and the parallax adjustment is performed, the subject as the object for the parallax adjustment can be focused on for which subject the parallax amount is substantially zero.

Incidentally, it should be understood that the presently disclosed subject matter is not limited to the aforementioned embodiments but that various variations or proper combinations of the individual embodiment may occur within the spirit of the presently disclosed subject matter.

What is claimed is:

1. A three-dimensional imaging device comprising:
   a first imaging unit including a first imaging optical system including a first focus lens, the first imaging unit including a first imaging sensor configured to perform photoelectric conversion on subject light imaged thereon through the first imaging optical system to output a first viewpoint image;
   a second imaging unit including a second imaging optical system including a second focus lens, the second imaging unit including a second imaging sensor configured to perform photoelectric conversion on subject light imaged thereon through the second imaging optical system to output a second viewpoint image;
   a storage configured to preliminarily store a focus position displacement amount which is a difference between a first lens position at which the first focus lens is positioned when a subject at a same distance is in focus and a second lens position at which the second focus lens is positioned when the subject at the same distance is in focus; and
   a focus adjustment unit which allows the first focus lens to perform search operation within a predetermined first search range upon focusing on a subject to be imaged, searches for a first lens position at which the subject to be imaged is focused on based on the first viewpoint image acquired from the first imaging unit, and moves the first focus lens to the searched first lens position, the focus adjustment unit which allows, as to the second imaging optical system, the second focus lens to perform search operation within a second search range which is narrower than the first search range and is in the vicinity of a lens position of the second focus lens corresponding to the searched first lens position, searches for a second lens position at which the subject to be imaged is focused on based on the second viewpoint image acquired from the second imaging unit, and moves the second focus lens to the searched second lens position, wherein when the first lens position at which the subject to be imaged is focused on is not found in case where search operation of the first focus lens is performed within the first search range, the focus adjustment unit allows the second focus lens to perform search operation within the first search range, searches for the second lens position at which the subject to be imaged is focused on based on the second viewpoint image acquired from the second imaging unit, moves the second focus lens to the searched second lens position, calculates the first lens position at which the subject to be imaged is focused on based on the searched second lens position and the focus position displacement amount stored in the storage, and moves the first focus lens to the first lens position.

2. The three-dimensional imaging device according to claim 1, wherein when the first lens position is not searched for and the second lens position is searched for within the first search range, the focus adjustment unit allows the first focus lens to perform search operation within the second search range which is narrower than the first search range and is in the vicinity of a lens position of the first focus lens corresponding to the searched second lens position, searches for the first lens position at which the subject to be imaged is focused on based on the first viewpoint image acquired from the first imaging unit, moves the first focus lens to the first lens position, when an in-focus position of the first lens position is not found within the second search range, calculates the first lens position based on the searched second lens position and the focus position displacement amount stored in the storage, and moves the first focus lens to the first lens position.

3. The three-dimensional imaging device according to claim 1, wherein when an in-focus position of the second lens position is not found within the second search range, the focus adjustment unit calculates the second lens position based on the searched first lens position and the focus position displacement amount stored in the storage, and moves the second focus lens to the second lens position.

4. The three-dimensional imaging device according to claim 1, wherein:

the focus adjustment unit includes a lens position storage configured to store a focus lens position at which the subject is focused on, which subject is at a subject distance corresponding to a cross point at which a light axis of the first imaging optical system crosses a light axis of the second imaging optical system, and when both the first lens position and the second lens position is not searched for within the first search range, the focus adjustment unit moves the first focus lens and the second focus lens to the focus lens position stored in the lens position storage.

5. The three-dimensional imaging device according to claim 1, further comprising:

a parallax adjustment unit configured to adjust parallax by performing relative image shift on the first viewpoint image and the second viewpoint image which are acquired respectively from the first imaging unit and the second imaging unit; and a distance calculation unit configured to calculate a subject distance corresponding to a cross point, at which a light axis of the first imaging optical system crosses a light axis of the second imaging optical system after virtual change of the light axes, based on a shift amount of the image shift performed by the parallax adjustment unit, wherein:

the focus adjustment unit includes a lens position storage configured to store a focus lens position at which the subject is focused on, which subject is at the subject distance, for each subject distance, and when both the first lens position and the second lens position is not searched for within the first search range, the focus adjustment unit reads out a lens position corresponding to the calculated subject distance from the lens position storage, and moves the first focus lens and the second focus lens to the read lens position.

6. The three-dimensional imaging device according to claim 5, further comprising a three-dimensional display unit configured to display a three-dimensional image based on the first viewpoint image and the second viewpoint image acquired respectively from the first imaging unit and the second imaging unit, wherein the parallax adjustment unit includes: a manipulation member configured to perform manual adjustment of parallax; and a first image shift unit configured to perform relative image shift on the first viewpoint image and the second viewpoint image regarding display position in the three-dimensional display unit according to manipulation of the manipulation member.

7. The three-dimensional imaging device according to claim 5, wherein the parallax adjustment unit includes: a detection unit configured to detect a position displacement of the subject to be imaged within focus areas of the first viewpoint image and the second viewpoint image acquired respectively from the first imaging unit and the second imaging unit; and a second image shift unit configured to perform relative image shift on the first viewpoint image and the second viewpoint image such that the detected position displacement becomes zero.

8. The three-dimensional imaging device according to claim 1, wherein:

the first imaging optical system and the second imaging optical system each includes a zoom lens, the storage preliminarily stores a focus position displacement amount between a first lens position of the first focus lens and a second lens position of the second focus lens in focusing on a subject at the same distance, for each zoom position of the zoom lens, and when calculating the first lens position, the focus adjustment unit reads out a focus position displacement amount corresponding to a zoom position of the zoom lens from the storage, and calculates the first lens position based on the focus position displacement amount and the searched second lens position.

9. The three-dimensional imaging device according to claim 3, wherein:
the first imaging optical system and the second imaging optical system each includes a zoom lens,
the storage preliminarily stores a focus position displacement amount between a first lens position of the first focus lens and a second lens position of the second focus lens in focusing on a subject at the same distance, for each zoom position of the zoom lens, and
when calculating the second lens position, the focus adjustment unit reads out a focus position displacement amount corresponding to a zoom position of the zoom lens from the storage, and calculates the second lens position based on the focus position displacement amount and the searched first lens position.

10. An autofocus adjustment method for a three-dimensional imaging device including:
a first imaging unit including a first imaging optical system including a first focus lens, the first imaging unit including a first imaging sensor configured to perform photoelectric conversion on subject light imaged thereon through the first imaging optical system to output a first viewpoint image;
a second imaging unit including a second imaging optical system including a second focus lens, the second imaging unit including a second imaging sensor configured to perform photoelectric conversion on subject light imaged thereon through the second imaging optical system to output a second viewpoint image; and
a storage configured to preliminarily store a focus position displacement amount which is a difference between a first lens position at which the first focus lens is positioned when a subject at a same distance is in focus and a second lens position at which the second focus lens is positioned when the subject at the same distance is in focus, wherein the method comprises:
a step of allowing the first focus lens to perform search operation within a predetermined first search range upon focusing on a subject to be imaged, and during the search operation, searching for a first lens position of the first focus lens at which position the subject to be imaged is focused on based on the first viewpoint image acquired from the first imaging unit;
a step of moving the first focus lens to the first lens position searched for within the first search range;
a step of determining a second search range which is narrower than the first search range and is in the vicinity of a lens position of the second focus lens corresponding to the searched first lens position;
a step of allowing the second focus lens to perform search operation within the determined second search range, and during the search operation, searching for a second lens position of the second focus lens at which position the subject to be imaged is focused on based on the second viewpoint image acquired from the second imaging unit;
a step of moving the second focus lens to the second lens position searched for within the second search range;
a step of, when the first lens position at which the subject to be imaged is focused on is not found in case where the search operation of the first focus lens is performed within the first search range, allowing the second focus lens to perform search operation within the first search range, and during the search operation, searching for the second lens position of the second focus lens at which position the subject to be imaged is focused on based on the second viewpoint image acquired from the second imaging unit;
a step of moving the second focus lens to the second lens position searched for in case where a search operation of the second focus lens is performed within the first search range;
a step of calculating the first lens position at which the subject to be imaged is to be focused on based on the second lens position searched for in case where the search operation of the second focus lens is performed within the first search range and the focus position displacement amount stored in the storage; and
a step of moving the first focus lens to the calculated first lens position.

11. The autofocus adjustment method for the three-dimensional imaging device according to claim 10, further comprising:
a step of, when the first lens position is not searched for and the second lens position is searched for within the first search range, determining the second search range which is narrower than the first search range and is in the vicinity of a lens position of the first focus lens corresponding to the searched second lens position;
a step of allowing the first focus lens to perform search operation within the determined second search range, and searching for the first lens position of the first focus lens at which the subject to be imaged is focused on based on the first viewpoint image acquired from the first imaging unit during the search operation; and
a step of moving the first focus lens to the first lens position searched for within the second search range.

12. The autofocus adjustment method for the three-dimensional imaging device according to claim 10, further comprising:
a step of, when an in-focus position of the second lens position is not found within the second search range, calculating the second lens position based on the searched first lens position and the focus position displacement amount stored in the storage; and
a step of moving the second focus lens to the calculated second lens position.

13. The autofocus adjustment method for the three-dimensional imaging device according to claim 10, wherein:
the three-dimensional imaging device further includes a lens position storage configured to store a focus lens position at which the subject is focused on, which subject is at a subject distance corresponding to a cross point at which a light axis of the first imaging optical system crosses a light axis of the second imaging optical system, and
the method further comprises a step of, when both the first lens position and the second lens position is not searched for within the first search range, moving the first focus lens and the second focus lens to the focus lens position stored in the lens position storage.

14. The autofocus adjustment method for the three-dimensional imaging device according to claim 10, wherein:
the three-dimensional imaging device further includes a lens position storage configured to store a focus lens position at which the subject at the subject distance is focused on for each subject distance, and
the method further comprises:
a step of adjusting parallax by performing relative image shift on the first viewpoint image and the second viewpoint image acquired respectively from the first imaging unit and the second imaging unit;

a step of calculating a subject distance corresponding to a cross point, at which a light axis of the first imaging optical system crosses a light axis of the second imaging optical system after virtual change of the light axes, based on a shift amount of the image shift performed by the step of adjusting parallax; and a step of, when both the first lens position and the second lens position is not searched for within the first search range, reading out a lens position corresponding to the calculated subject distance from the lens position storage, and moving the first focus lens and the second focus lens to the read lens position.

* * * * *